United States Patent [19]

Khello

[11] Patent Number: 5,657,451
[45] Date of Patent: Aug. 12, 1997

[54] SYSTEM FOR DETERMINING WHETHER TO ACCEPT NEW SUPPLEMENTARY SERVICES BASED UPON IDENTIFIED TYPES OF SUPPLEMENTARY SERVICE INTERACTIONS AND IDENTIFIED SUPPLEMENTARY SERVICE INTERACTION CRITERIA

[75] Inventor: Robert Khello, Norsborg, Sweden

[73] Assignee: Telefonaktiebolaget LM Ericsson, Stockholm, Sweden

[21] Appl. No.: 186,172

[22] Filed: Jan. 24, 1994

[51] Int. Cl.$^6$ .................................................. G06F 13/00
[52] U.S. Cl. ................................. 379/201; 370/259
[58] Field of Search ............................ 379/88, 242, 243, 379/244, 245, 112, 201, 219, 220; 395/500, 200.11, 831, 834, 839, 200.01, 200.02, 200.03, 616; 370/396

[56] References Cited

U.S. PATENT DOCUMENTS

| | | | |
|---|---|---|---|
| 4,479,196 | 10/1984 | Ferrer et al. | 395/611 |
| 4,695,977 | 9/1987 | Hansen et al. | 379/94 |
| 4,727,575 | 2/1988 | Hansen et al. | 379/94 |
| 4,780,821 | 10/1988 | Crossley | 395/670 |
| 4,782,517 | 11/1988 | Bernardis et al. | 379/201 |
| 5,337,351 | 8/1994 | Manabe et al. | 379/201 |
| 5,392,344 | 2/1995 | Ash et al. | 379/221 |
| 5,428,665 | 6/1995 | Lantto | 379/58 |
| 5,436,957 | 7/1995 | McConnell | 379/88 |
| 5,452,341 | 9/1995 | Sattar | 379/88 |
| 5,528,677 | 6/1996 | Butler et al. | 379/196 |

FOREIGN PATENT DOCUMENTS

| | | |
|---|---|---|
| 0 509 705 A2 | 10/1992 | European Pat. Off. . |
| 4-42954 | 9/1993 | Japan . |
| 4-44237 | 9/1993 | Japan . |
| 4-44278 | 9/1993 | Japan . |

OTHER PUBLICATIONS

"Adjuct base operation of digital loop carrier technology", Thomso, IEEE Adsel Telecommunications Conference, 91.

"UPT supplementary services: European standards scenario", Cauler et al Universal Personal Communication, 92.

"A signaling protocol supporting multi–media and supplementor", Hellemay et al, IEEE Global Telecommunication Conference, 92.

"Application profile for ISDN", Wakid et al, Proceeding of the IEEE, Feb. 1991.

Simon Littlejohn, "Developing a Universal Personal Telecommunication Service", *Feature*, May 1992, pp. 39–42.

"A Feature–InteractionBenchmark for IN and Beyond," *IEEE Communications Magazine*, E. Jane Cameron, Nancy Griffeth, Yow–Jian Lin, Margaret E. Nilson, William K. Schnure, and Hugo Velthuijsen, Mar. 1993, pp. 64–69.

"Managing Run–Time Interactions Between Call–Processing Features," *IEEE Communications Magazine*, Michael Cain, Feb. 1992, pp. 44–50.

(List continued on next page.)

*Primary Examiner*—Moustafa M. Meky
*Attorney, Agent, or Firm*—Jenkens & Gilchrist, P.C.

[57] ABSTRACT

A generic service coordination mechanism solves feasible service interaction problems taking into account real-time processing constraints within telecommunication networks. The coordination mechanism limits service interaction complexity within an active basic call by preventing interactive service accessibility as early as possible following the request of a new service. Data defined on the basis of a general allocation, an individual subscriber allocation, and a service allocation is manipulated during provision and withdrawal, activation and deactivation, and invocation and operation of service procedures. Requests to initiate, read, change, or erase subscription and interaction data are processed internally according to a coordinator state machine. Requests are terminated by a response which includes a decision to continue basic call processing and service processing based on allocated services and encountered service interaction criteria such as restriction or dependency criteria.

18 Claims, 15 Drawing Sheets

OTHER PUBLICATIONS

"TMN+IN=TINA," *IEEE Communications Magazine*, Menso Appeldorn, Roberto Kung, and Roberto Saracco, Mar. 1993, pp. 78–85.

"A Method for Detecting Service Interactions," *IEEE Communications Magazine*, Yasushi Wakahara, Masanobu Fujioka, Hiroyuki Kikuta, Hikaru Yagi, and Sei–ichiro Sakai, Aug. 1993, pp. 32–37.

"Feature Interactions in Telecommunications Systems," *IEEE Communications Magazine*, E. Jane Cameron and Hugo Velthuijsen, pp. 18–23.

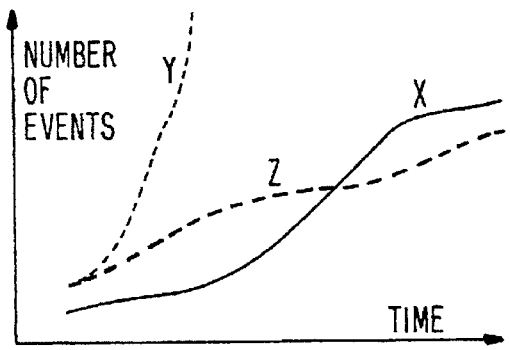

FIG. 1

X: DEGREE OF SERVICE INCREASE
Y: UNCONTROLLED GROWTH OF SERVICE INTERACTIONS
Z: GROWTH OF SERVICE INTERACTIONS CONTROLLED
   BY COORDINATION MECHANISM

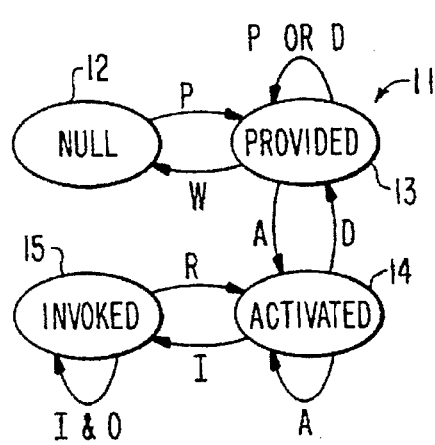

A: ACTIVATION;    P: PROVISION;
D: DEACTIVATION;  R: RELEASE;
I: INVOCATION;    W: WITHDRAWAL
O: OPERATION;

FIG. 2

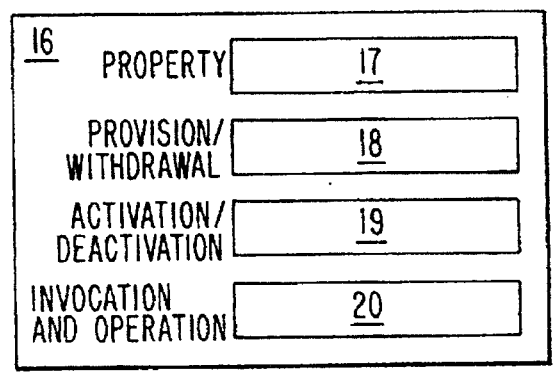

FIG. 4

|  | DEFINITIVE INTERACTION | | IRRESOLUTE INTERACTION |
|---|---|---|---|
|  | PERMISSIVE | PRIORITY |  |
| PROVISION & WITHDRAWAL | A/R/D | — | — |
| ACTIVATION & DEACTIVATION | A/R/D | O/S | Y/N |
| INVOCATION & OPERATION | A/R/D | O/S | Y/N |

FIG. 3

A: ALLOWED;    N: NO;         R: RESTRICTED;  Y: YES;
D: DEPENDENT;  O: OVERRIDE;   S: SUPPRESSED;  —: NOT APPLICABLE

FIG. 5

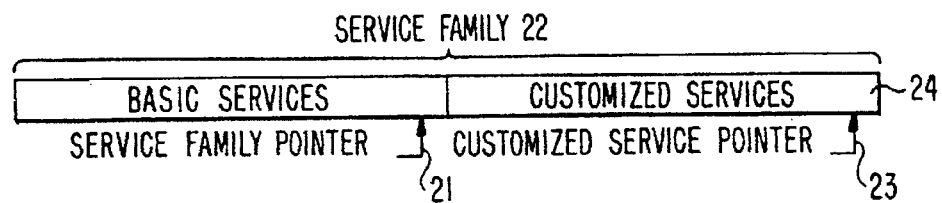

FIG. 6

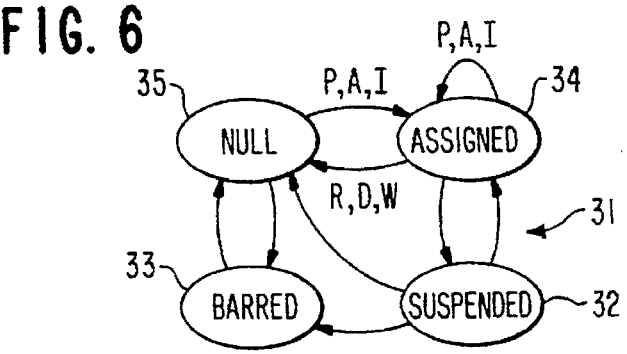

| STATE | CODING | COMMENTS |
|---|---|---|
| NULL | 00 | NO INDICATION EXISTS |
| ASSIGNED | 01 | THE SERVICE STATE IS VALID |
| SUSPENDED | 11 | THE SERVICE STATE IS TEMPORARY BARRED |
| BARRED | 10 | THE SERVICE STATE IS BARRED |

FIG. 7

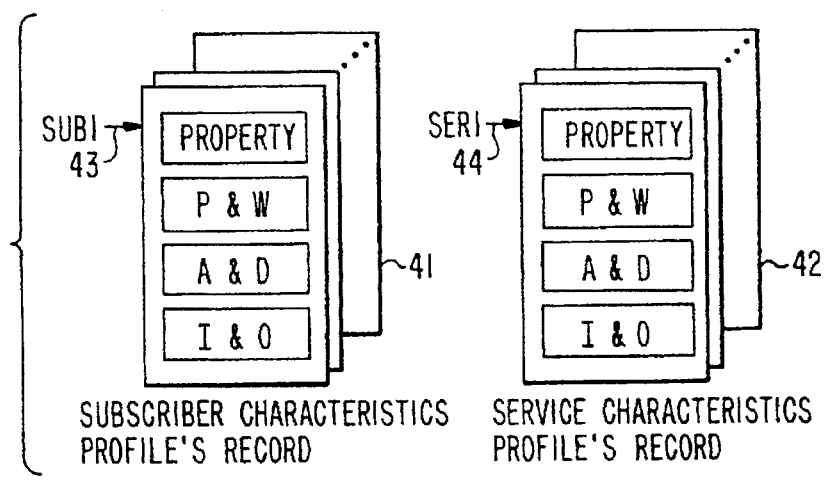

SUBSCRIBER CHARACTERISTICS PROFILE'S RECORD

SERVICE CHARACTERISTICS PROFILE'S RECORD

FIG. 8

SERVICE IDENTIFIER ⌷·············
SERVICE STATE: PROVIDED  [X]
SERVICE STATE: ACTIVATED [X]
SERVICE STATE: INVOKED   [X]
X: DESIGNATE THE COORDINATOR MACHINE STATE

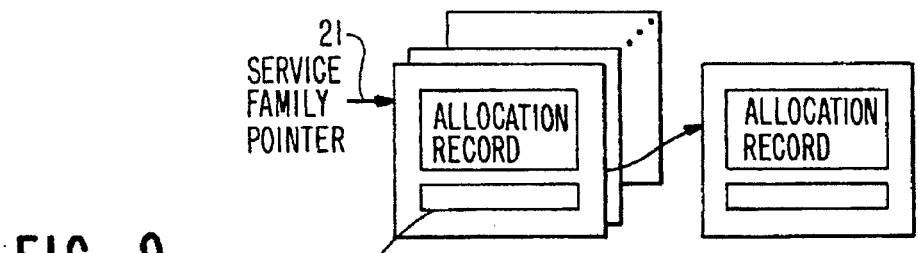
FIG. 9
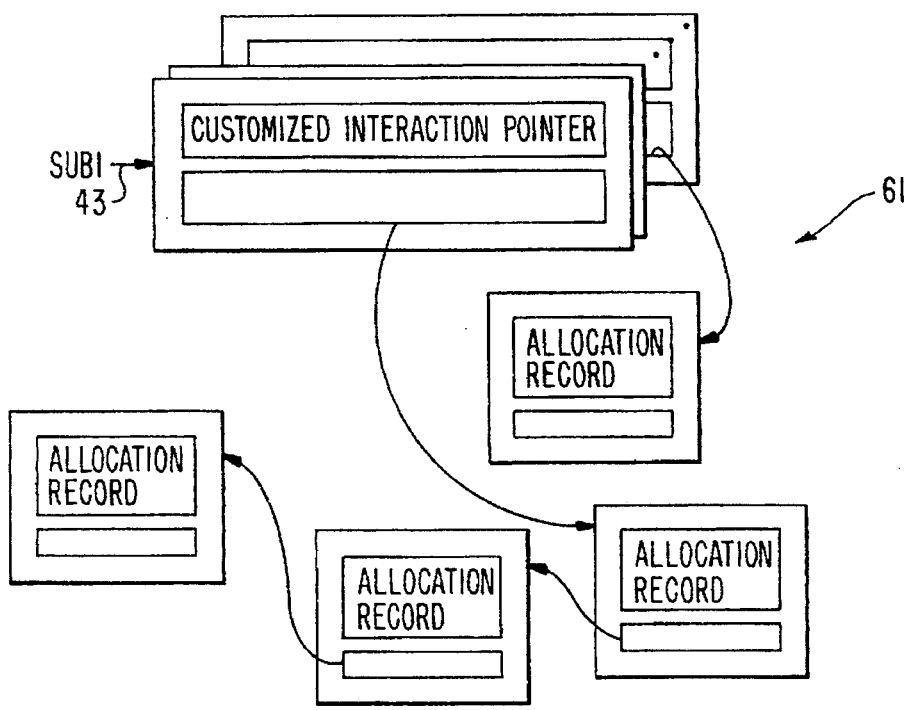
FIG. 10
FIG. 11A
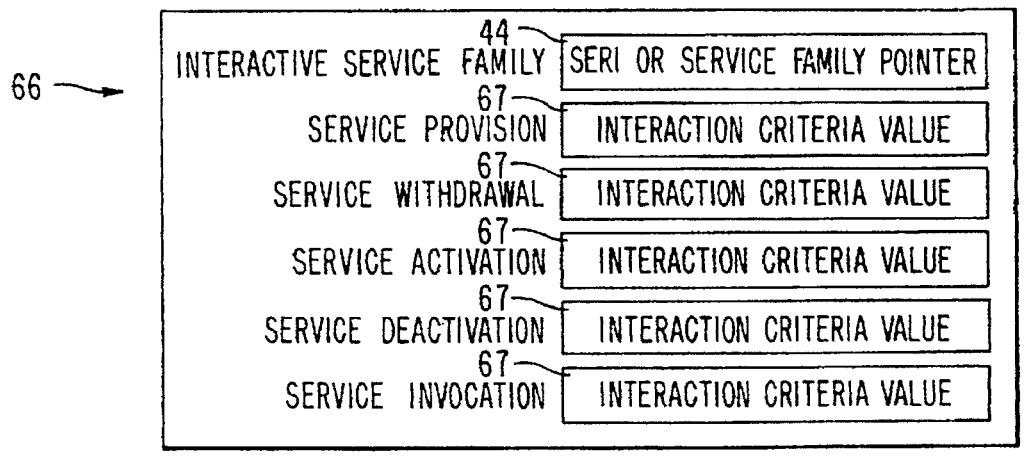

FIG. 11B
```
RD  OS  Y   COMMENTS
00  00  0   NO INTERACTION
00  00  1   IRRESOLUTE INTERACTION
00  01  0   SUPPRESSED SERVICE
00  01  1   SUPPRESSED AND IRRESOLUTE SERVICE
00  10  0   OVERRIDDEN SERVICE
00  10  1   OVERRIDDEN AND IRRESOLUTE SERVICE
01  00  0   DEPENDANT EXISTS
01  00  1   DEPENDANT AND IRRESOLUTE SERVICE
10  00  0   RESTRICTED SERVICE
```
FIG. 12A
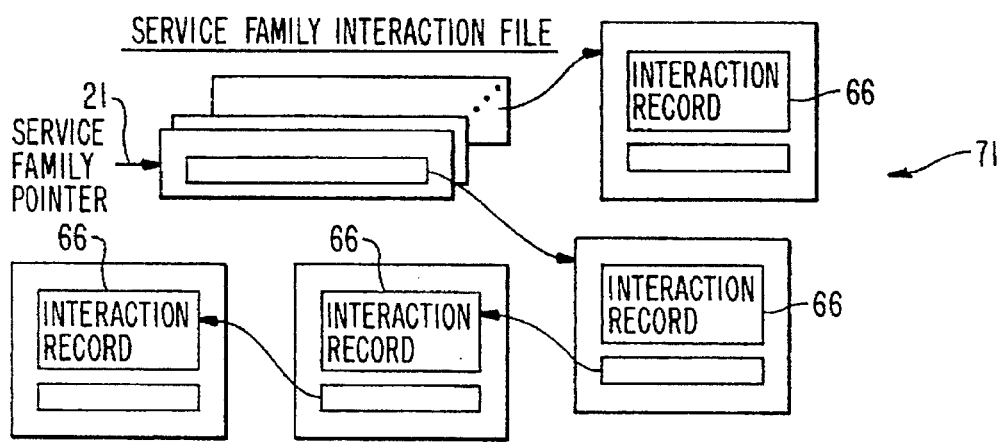
FIG. 12B
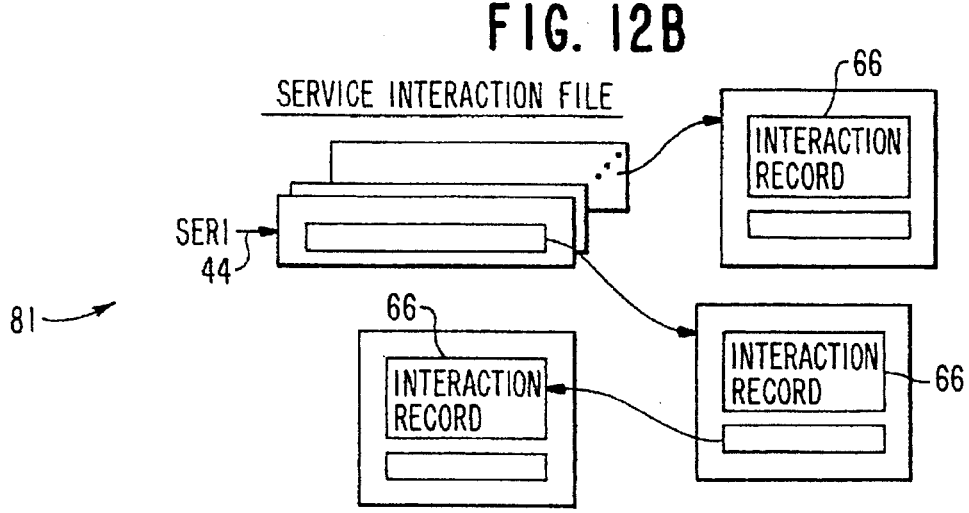

FIG. 13
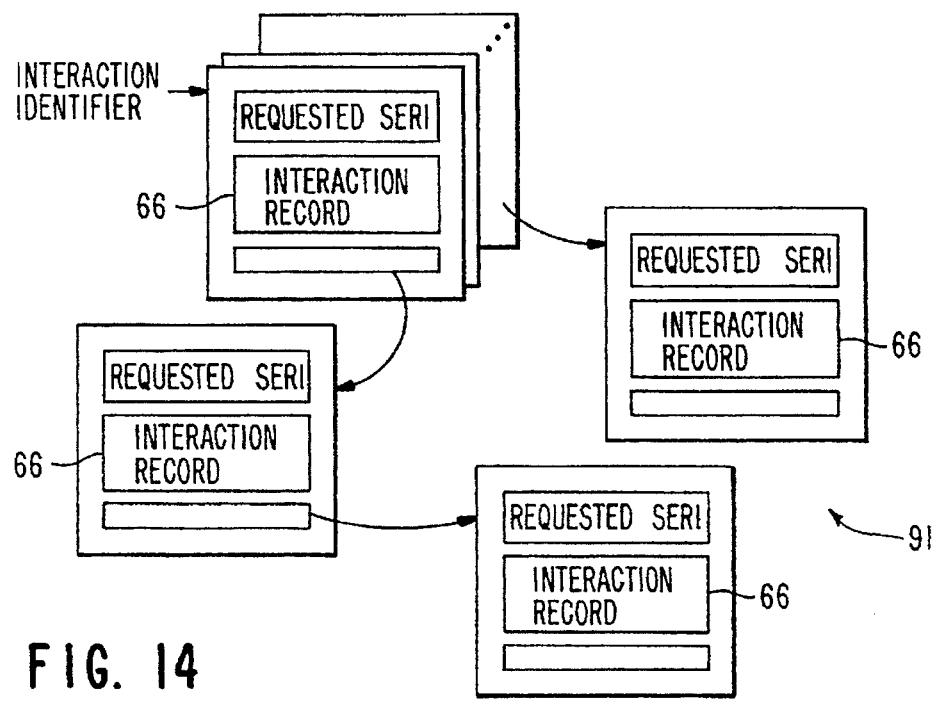
FIG. 14
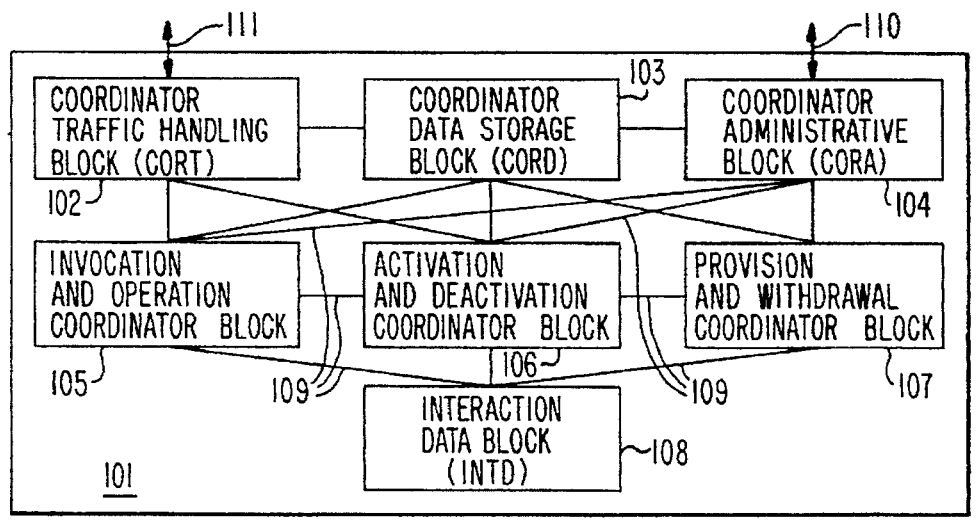
FIG. 15
| PARAMETER NAME | VALUES | REQUEST | RESPONSE |
|---|---|---|---|
| PROFILE TYPE | SERVICE/USER | MANDATORY | MAN. |
| COORDINATOR PROCESS | I,R,C,E | MAN. | MAN. |
| IDENTIFIER | SUBI/SERI | MAN./OPT. | MAN. |
| PROPERTY | VALUE | OPTIONAL | OPT. |
| P & W | VALUE | OPT. | OPT. |
| A & D | VALUE | OPT. | OPT. |
| I & O | VALUE | OPT. | OPT. |
| ERROR INDICATOR | Y/N | - | MAN. |

FIG. 16

| PARAMETER NAME | VALUES | REQ. | RESP. |
|---|---|---|---|
| SERVICE PROCEDURE | P,A,I,D,W | MAN. | MAN. |
| COORDINATOR PROCESS | I,R,C,E | MAN. | MAN. |
| SUBSCRIBER IDENTIFIER | SUBI | OPT. | MAN. |
| SERVICE IDENTIFIER | SERI | OPT. | MAN. |
| GENERAL ALLOCATION | Y/N | OPT. | MAN. |
| MORE INFO INDICATOR | Y/N | OPT. | - |
| ERROR INDICATOR | Y/N | - | MAN. |

FIG. 17

| PARAMETER NAME | VALUES | REQ. | RESP. |
|---|---|---|---|
| SERVICE PROCEDURE | P,A,I,D,W | MAN. | MAN. |
| COORDINATOR PROCESS | I,R,C,E | MAN. | MAN. |
| SUBSCRIBER IDENTIFIER | SUBI | OPT. | - |
| SERVICE IDENTIFIER | SERI | OPT. | - |
| INTERACTIVE SERVICE | SERI | OPT. | OPT. |
| SERVICE FAMILY | Y/N | OPT. | OPT. |
| SWAP INDICATOR | Y/N | OPT. | - |
| INTERACTION CRITERIA | VALUE | OPT. | OPT. |
| MORE INFO INDICATOR | Y/N | OPT. | OPT. |
| ERROR INDICATOR | Y/N | - | MAN. |

FIG. 27

SERVICE CLASSIFICATION PARAMETER FIELD CODES

BITS BA: CALL STATE VALIDATION INDICATOR
00 NO INFORMATION
01 VALID ON IDLE CALL STATE
10 VALID ON BUSY CALL STATE
11 UNCONDITIONAL CALL STATE

BITS DC: CALL PHASE INDICATOR
00 NONE CALL RELATED SERVICE
01 CALL SETUP PHASE SERVICE
10 MID-CALL PHASE SERVICE
11 CALL CLEARING PHASE SERVICE

BITS FE: CALL SIDE RELATION INDICATOR
00 NO INFORMATION
01 ORIGINATING SIDE SERVICE
10 TERMINATING SIDE SERVICE
11 SPARE

BITS G: SERVICE TYPE INDICATOR
0 BASIC SERVICE
1 SUPPLEMENTARY SERVICE

BITS H: SPARE

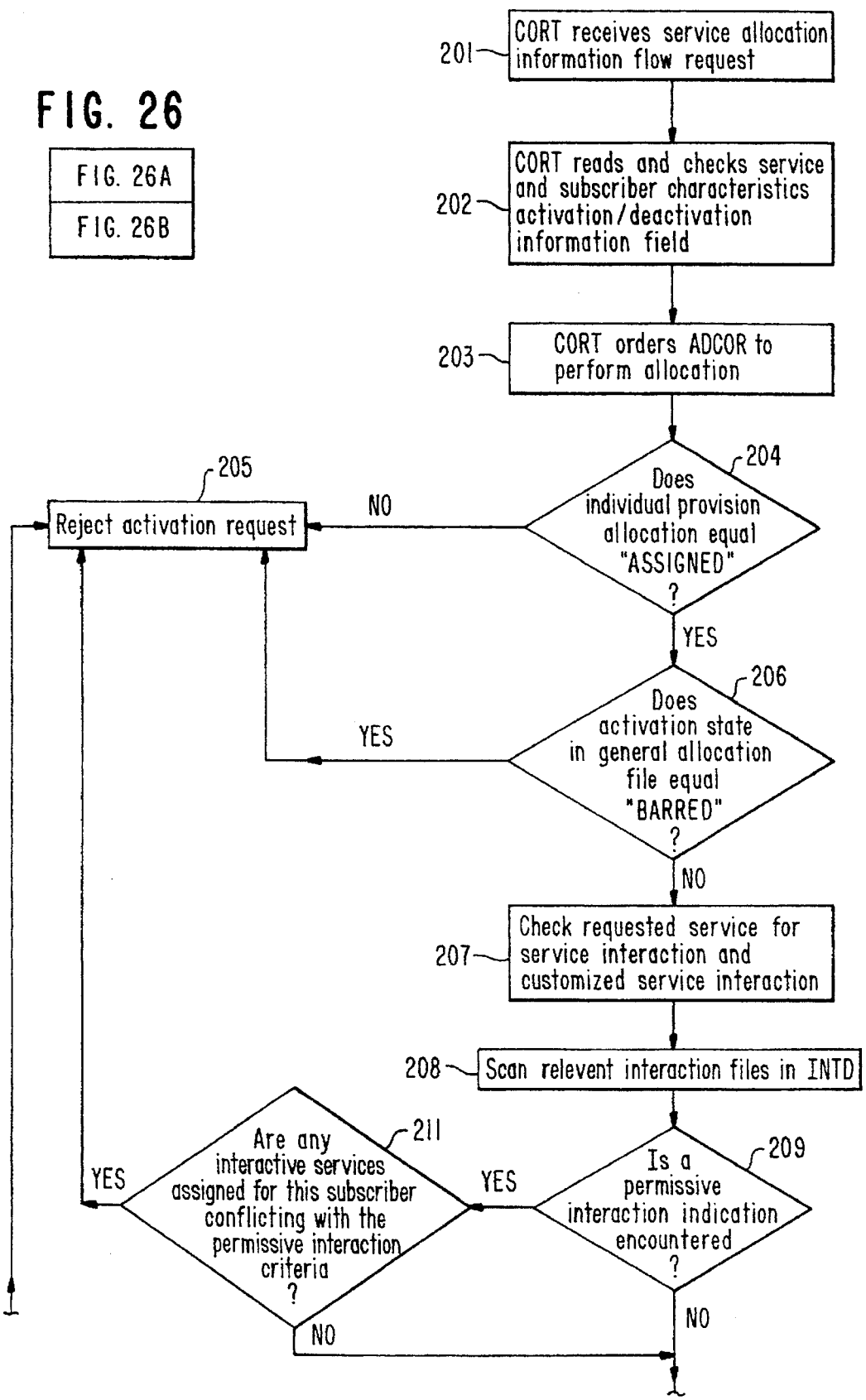

SYSTEM FOR DETERMINING WHETHER TO ACCEPT NEW SUPPLEMENTARY SERVICES BASED UPON IDENTIFIED TYPES OF SUPPLEMENTARY SERVICE INTERACTIONS AND IDENTIFIED SUPPLEMENTARY SERVICE INTERACTION CRITERIA

FIELD OF THE INVENTION

This invention relates to the control of real-time processes and, in particular, to the utilization of automatic procedures to solve service interaction problems within a communication system.

BACKGROUND OF THE INVENTION

The deregulation of telecommunication markets and the introduction of new concepts such as advanced intelligent networks (AIN) and universal personal telecommunications (UPT), incorporating the ability to customize services, have resulted in rapid growth of the number of services demanded by and offered to telecommunication customers. This growth is projected to continue for the foreseeable future.

The projected increase in the number of services requires increased sophistication and complexity of service-providing systems, and creates the potential of an explosive increase in the number of service interaction problems. In mathematical terms, the number of interaction problems, related to the number of services (n), may potentially be as high as n-factorial (n!). Fortunately, in practice, the number of service interaction problems is limited below this theoretical maximum by service definition and other telecommunication factors. However, the total number of service interaction problems that must be recognized and solved is still very large and increasing.

The conventional method used to solve these interactions is generally imbedded in the specific implementation of a particular service. This makes the upgrade of a telecommunication system with new services costly and time consuming. The combination of costly, time-consuming upgrades and the rapid development of new system concepts and service offerings requires a comprehensive solution to the service interaction problem.

For a number of years, attempts have been made to solve service interaction problems without any measurable success. In some cases, the service interaction problems have been so numerous, that the proposed solutions were extremely complex and difficult to implement. In other cases, the proposed solutions are only partial solutions that do not provide an ultimate method of handling the service interaction problem.

For example, in U.S. Pat. No. 4,479,196 to Ferrer et al. (Ferrer), a database management system in the form of a state machine is disclosed. Ferrer associates a specific incoming request with internally stored data using pre-defined relationships which are specifically defined for a particular application. It would be advantageous, however, to have a generic coordination mechanism, such as the mechanism of the present invention, which utilizes two state machines operating at different functional levels in order to provide generic solutions for service interaction problems.

U.S. Pat. No. 4,695,977 to Hansen et al. (Hansen '977) discloses a telecommunication system for the switching of voice and data communications by a computer. The computer performs basic call processing by executing program scripts to perform the sequential processing of events and signals based on a finite state machine and the priority between events. Service interaction problems are solved by the Hansen '977 system based on the priority assigned to each script. It would be advantageous to have a generic coordination mechanism, such as the mechanism of the present invention, which separates service interaction handling from the basic call processing state machine. With such a mechanism, the service interaction handling is not restricted to pre-established priorities between events. Furthermore, the present invention operates entirely on data related to service interaction, and can utilize this data to define different service interaction criteria depending on customer requirements and the application concerned.

Likewise, U.S. Pat. No. 4,272,575 to Hansen et al. (Hansen '575) discloses a system for sequentially processing a telephone call based on detected events and event-processing results. This processing is part of the processing used in intelligent networks to control the execution and establishment of a basic call. Services may be controlled by the Hansen '575 system, but the control is part of the basic call state machine, and its capabilities are necessarily limited when compared to the generic coordination mechanism of the present invention. The generic coordination mechanism separates the service interaction handling from the basic call processing and, therefore, can define different service interaction criteria depending on customer requirements and the application concerned.

In U.S. Pat. No. 4,782,517 to Bernardis et al. (Bernardis), a telephone system is disclosed which allows a user to provide new services without reloading a new version of the system software. Although the Bernardis system monitors and processes events and modifies state transition rules, it does not handle service interactions. It would be a distinct advantage to have a generic coordination mechanism, such as the mechanism of the present invention, which is dedicated to solving the service interaction problem without interfering with basic call processing. The coordination mechanism of the present invention does not define or provide new services, but strictly handles service interaction data for improved reliability. Additionally, the generic coordination mechanism includes "hard coded" software which operates according to defined coordinator characteristics, and reports back stored service interaction data in accordance with defined service interaction criteria.

Thus, the generic coordination mechanism of the present invention is a generic service interaction handler capable of controlling the growth of service interaction complexity, minimizing influence on other service implementations, enabling a rapid service offering, and providing increased reliability of telecommunication systems.

SUMMARY OF THE INVENTION

The present invention is a generic service coordination mechanism which manipulates data that is relevant to the service interaction problem and to operations which result in state machine transitions.

The mechanism is invoked by a traffic event or an administrative event such as Initiate, Read, Change or Erase Coordinator, or Interaction Data. These events are processed by different internal subordinated processes which are run in a sequence until a coordination response is obtained. The processing of an event includes validation of received data, location of the requested information, checking existing inconsistencies, and rejection or acceptance of a requested event.

In addition, two methods employed by the present invention allow an operator or service provider to block the occurrence of two unpredictable interactive services during real-time network operation. The first method is a method of representing coordinator data, i.e., service allocation data, coordinator characteristics data, and interaction data. The second method is a method of operating the coordinator state machine by association of service state machine transitions and coordinator state machine transitions.

The service interaction problem may be divided into a feasible part and an irresolute interaction problem. The feasible part may be solved through a combination of restriction, dependency, and priority processes. Since the service interaction problem may vary in complexity at different times, the mechanism of the present invention solves the feasible part of the service interaction problem and then identifies the irresolute interaction problem which is handled entirely by the appointed interactive services. The identification of the irresolute interaction includes a temporary hand-over of interaction processing to the interactive services until a resolution is reached concerning whether or not the mechanism of the present invention shall resume processing or reject the requested event. Thus, the functionality of the coordination mechanism can be summarized as enabling a decision to continue basic call processing and/or service processing based on requested subscriber services and associated service interactions.

Finally, the mechanism also employs methods to handle general and individual service provisioning as well as the capability to customize services and service interactions.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 1 is a graph illustrating the relationship, in a telecommunications network, between the number of services offered, the number of resulting service interactions in an uncoordinated network, and the number of service interactions in a network equipped with a service coordination mechanism constructed in accordance with the teachings of the present invention;

FIG. 2 is a block diagram of a service state machine illustrating the transition of a service from one state to another in the present invention;

FIG. 3 is chart illustrating various service interaction criteria utilized in the coordination mechanism of the present invention;

FIG. 4 is an illustration of a record maintained by the present invention and providing a profile of the characteristics of a particular subscriber or service;

FIG. 5 is an illustration of a service identifier utilized in the present invention to identify a service family and variation of a service within the family;

FIG. 6 is a block diagram of a coordination mechanism state machine utilized in the service coordination mechanism of the present invention;

FIG. 7 is an illustration of a series of subscriber characteristics profiles and a series of service characteristics profiles which are stored as dedicated files in the present invention;

FIG. 8 is an illustration of a service allocation indication file utilized in the present invention to store the service states and associated coordinator mechanism states which are valid for a particular subscriber;

FIG. 9 is an illustration of a general allocation file utilized in the present invention to store service states and associated coordinator mechanism states for services which are provided on a general basis to a specific group of subscribers;

FIG. 10 is an illustration of a dynamic file structure of an individual allocation file in the service coordination mechanism of the present invention;

FIG. 11A is an illustration of an interaction record which identifies relevant interactions associated with service procedures in the service coordination mechanism of the present invention;

FIG. 11B is a table illustrating allowed combinations of service criteria in the service coordination mechanism of the present invention;

FIG. 12A is an illustration of a service family interaction file in the service coordination mechanism of the present invention;

FIG. 12B is an illustration of a service interaction file in the service coordination mechanism of the present invention;

FIG. 13 is an illustration of a customized service interaction file in the service coordination mechanism of the present invention;

FIG. 14 is a high level functional block diagram illustrating the interaction between various functional blocks in the generic service coordination mechanism of the present invention;

FIG. 15 is a table illustrating profile data information flow utilized in the manipulation of profile files in the service coordination mechanism of the present invention;

FIG. 16 is a table illustrating allocation data information flow utilized in the manipulation of allocation files in the service coordination mechanism of the present invention;

FIG. 17 is a table illustrating interaction data information flow utilized in the manipulation of interaction files in the service coordination mechanism Of the present invention;

26A–26B collectively depict a flowchart of a routine performed by the coordination mechanism of the present invention when a request for service activation is received through the traffic interface; and FIG. 27 is table illustrating service classification parameter field codes utilized in a service classification indicator of eight bits in an alternative embodiment of the service coordination mechanism of the present invention.

DETAILED DESCRIPTION

Figure 18:
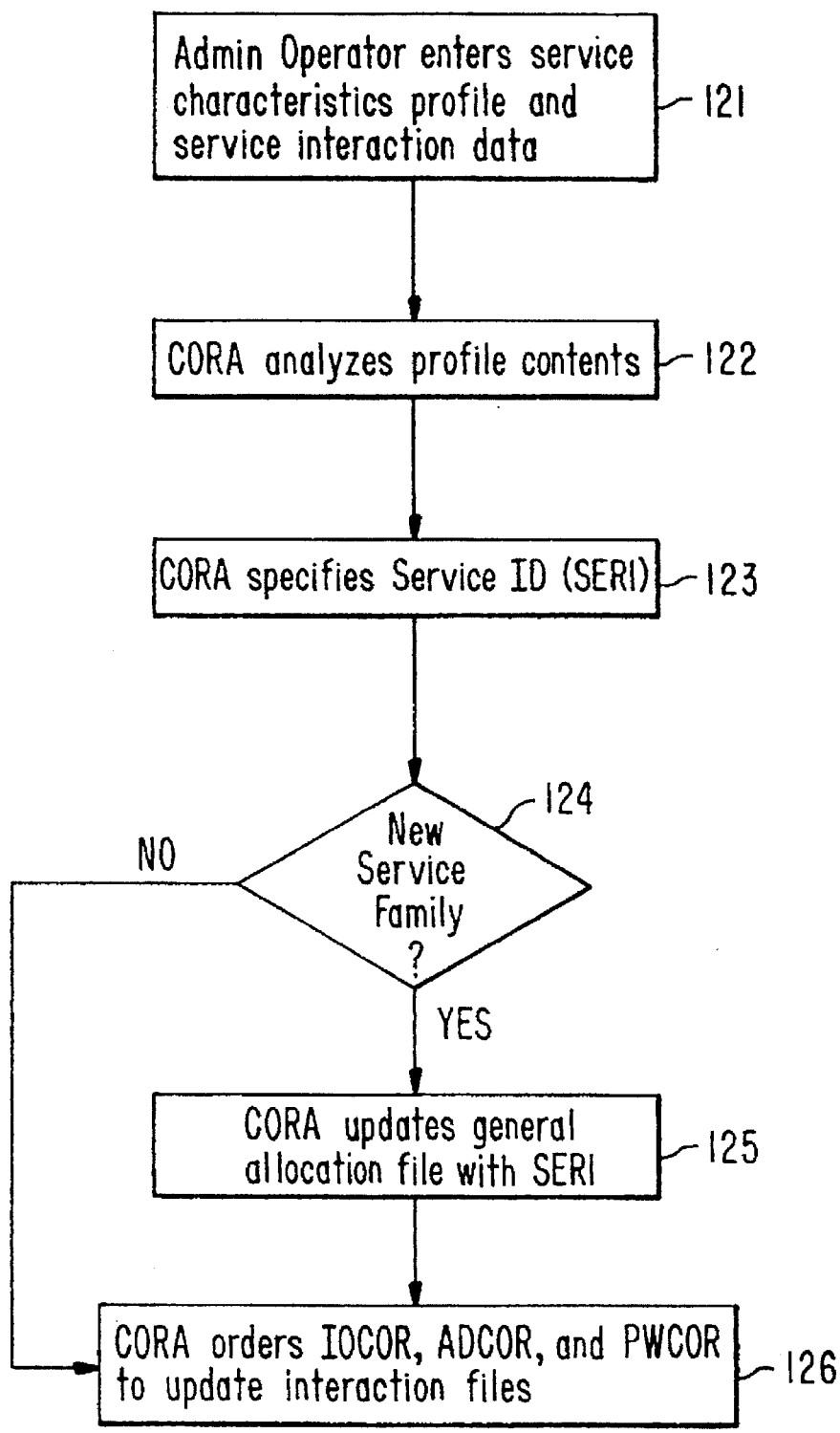
FIG. 18 depicts a flowchart of a service deployment routine performed by the coordination mechanism of the present invention.

The present invention is a generic service coordination mechanism which manipulates data that is relevant to the service interaction problem and to operations which result in state machine transitions.

FIG. 1 is a graph illustrating the relationship, in a telecommunications network, between the number of services offered, the number of resulting service interactions in an uncoordinated network, and the number of service interactions in a network equipped with a service coordination mechanism constructed in accordance with the teachings of the present invention.

Functionally, the service coordination mechanism controls the increasing service interaction problem through three steps as follows:

(1) Performing a comprehensive analysis of services in a real-time telecommunication network, thereby identifying the service and network elements which affect service processing, and collecting the data associated with the service interaction problem;

(2) Performing a comprehensive analysis of the service interaction problem identifying different types of service interactions and the service interaction criteria which are valid for each service procedure; and (3) Employing a mechanism which utilizes novel methods and processes to manipulate the service interactions on the fly, to respond to the user's service requests in association with defined interactions, and to provide the capability to customize services and service interactions.

By grouping the identified relevant data in different files and specifying a service state machine as well as a coordinator state machine, the coordination mechanism is made generic through simple procedures which perform state machine transitions according to the data file contents.

The coordination mechanism controls the service interaction problem by restricting the number of active services which can operate simultaneously on an active call. This is done by blocking or suppressing services upon reception of activation requests or invocation service procedure requests, taking into consideration general provisioning, service customizing, and real-time processing constraints.

The functions performed by the coordination mechanism include:

Consistent service provisioning. The mechanism does not allow a service to be provided unless the subscriber and the service characteristics are compatible;

Service restriction. The mechanism does not allow a service to be activated or invoked unless its specified service interactions are checked without resulting in an interference;

Service suppression. The mechanism causes an activation or invocation procedure of a superior service to automatically and temporarily suppress an inferior service until the superior service is deactivated or released; p1 Service interference blocking. The mechanism blocks a service interference with another service, detected during real-time network operation, until a correction is loaded into the system that does not affect the allocation of interference services to users; and Statistics maintenance. The mechanism maintains enhanced statistics measurements on service operations in the network.

In order to identify the elements of a generic service coordination mechanism, comprehensive analyses must be performed of (1) telecommunication service characteristics, and (2) the service interaction environment with regard to the subscriber allocation to the network.

Service Analysis

A telecommunication service is specified by the "service prose definition and description", referred to as the stage 1 description in Recommendation I.130 from the Consultative Committee on International Telegraphy and Telephony (CCITT), which is hereby incorporated by reference herein. CCITT Recommendation I.130, which provides a general modelling method for all services, is written from a user's point of view, independent of implementation. The stage 1 description states that service processing in a telecommunication network consists of the following procedures:

Provision/withdrawal;

Activation/deactivation/registration;

Invocation and operation; and

Interrogation/editing.

For purposes of the present invention, the registration procedure is essentially equivalent to the activation procedure. The interrogation and editing procedures are neutral service operations that are performed in all service states.

FIG. 2 is a block diagram of a service state machine 11 illustrating the transition of a service from one state to another in the present invention. A successful service procedure or operation requested by a user enables the service processing to change its state for that user according to the service state machine 11. The states 12–15 illustrated in FIG. 2 are "null" 12 in which a service has not been assigned to the user, "provided" 13 in which the service has been provided to a user having the capability to activate the service, "activated" 14 in which a service has been activated by a user having the capability to invoke the service, and "invoked" in which a user is making use of the service by operating the service in relation to a basic call. The service state machine 11 forms a fundamental element of the service coordination mechanism of the present invention.

A telecommunication service consists of a "basic service" (i.e., bearer service and/or a teleservice) associated with additional services known as "supplementary services", when classified according to CCITT Recommendation I.210, which is hereby incorporated by reference herein. Supplementary services are further associated with another level of classification indicating the service definition in the network. This extended classification may be used to facilitate interaction handling due to different service behaviors and interference requirements. For example, a service can be any one of the following:

an originating service (e.g., Calling Line Identification Restriction (CLIR));

a terminating service (e.g., Call Forwarding Unconditional (CFU));

a mid-call service (e.g., Meet Me Conference (MMC)); or a network service (e.g., Free Phone (FPH)).

In addition, the functionality of a service in a telecommunication network depends on the subscriber's connection and service allocation characteristics as well as the service's operational environment and its characteristics. Thus, the following non-inclusive list of associative data may influence or affect the manipulation of a service's functionality within a telecommunication call:

network type (e.g., private, public, etc.);

access type (e.g., analog, digital, radio, etc.);

service type (e.g., basic, supplementary, etc.);

user class (e.g., attendant, operator, etc.); and state criteria (e.g., general provision, etc.).

Service Interaction Analysis.

As previously stated, in addition to a comprehensive analysis of telecommunication service characteristics, a similar analysis of the service interaction environment with regard to the subscriber allocation to the network must be performed. Prior to the service interaction analysis, a distinction between the interaction problems and the network interworking problems is necessary. Network interworking appears between all types of services while service interaction is generally restricted to supplementary services. Separating the two types of problems provides increased efficiency in solving the service interaction problem.

Generally, the term "service interaction" indicates that two or more services coexist under certain specific conditions. These conditions, which are usually specified in the service prose definition and description, describe the necessary actions needed to eliminate possible damage caused by possible service interferences.

Additionally, in a complex telecommunication system, there are different kinds of interactions, namely, simple interactions and complex interactions; a simple interaction is based on a decisive criterium indicating whether a service procedure request is accepted or rejected when conflicting with allocated services. For example, three party (3PTY) service cannot be provided unless the subscriber already has call hold (HOLD) service. A complex interaction is one which requires a degree of cooperation between interactive services.

Thus, a simple analysis of the service interaction problem results in two types of interactions:

1) Definitive interactions which solve the interference problem between services using decisive procedures; and 2) Irresolute interactions which affect service functionality or cannot be classified as a definitive interaction.

The level of complexity, when comparing the two types of interactions, indicates that the irresolute interaction is an uncontrollable interaction which can be solved only within the interfering service entities, and its solution is regarded as part of the service development. The definitive interaction, on the other hand, is a feasible interaction which can be solved or controlled by a service coordination mechanism. Therefore, the elements of the service coordination mechanism of the present invention are based on an extended analysis of the definitive interaction criteria.

A definitive interaction can be characterized as a feasible interaction based on either a permissive or a priority-decisive process performed in association with a service procedure request. The permissive process indicates an unprogressive interactive condition (i.e., yes or no), while the priority process indicates a progressive interaction condition associated with a predefined action (i.e., the process controls the processing of one interactive service request by preclusion or exclusion of other interactive services).

FIG. 3 is chart illustrating various service interaction criteria utilized in the coordination mechanism of the present invention. The following criteria may be applied to various services to aid in handling service interaction problems:

| Criteria | Meaning |
| --- | --- |
| Allowed (A): | Designates "no interaction". |
| Restricted (R): | Designates an interaction which denies a service procedure request due to the existence of another service. |
| Dependent (D): | Designates an interaction which denies a service procedure request unless another service already exists. |
| Override (O): | Designates an interaction in which one service has higher priority than another existing service. Upon a service procedure request, the inferior service is automatically suppressed until the superior service procedure is recalled. |
| Suppressed (S): | Designates an interaction in which one service has lower priority than another existing service. Upon a service procedure request, the availability of a superior service controls whether the inferior service procedure request can be performed or rejected. |

Generic Service Coordination Mechanism

The generic service coordination mechanism of the present invention manipulates the definitive service interaction criteria during real-time network operation without affecting the designed service. The coordination mechanism also controls the service processing within a network. This results in increased flexibility, thereby achieving a drastic reduction in the number of service interaction problems, and allowing a limitation of irresolute interactions, an enhanced operational interface, and a more friendly user interface.

The following areas are addressed in the design of the preferred embodiment of the basic coordination mechanism of the present invention:

Coordination mechanism characteristics;

Coordination mechanism prerequisites;

Coordination mechanism state machine;

Coordination mechanism data structure; and

Coordination mechanism architecture.

Coordination Mechanism Characteristics

The coordination of a service depends on the requested service procedure, in conjunction with a valid service state and specified service interaction criteria. The coordination requirements for various service procedures are unrelated to some extent, therefore the characteristics of the generic coordination mechanism are specified for predefined related service procedures, as identified in FIGS. 2 and 3, i.e., provision/withdrawal, activation/deactivation, and invocation and operation.

At the time of a service provision or withdrawal procedure request, the coordination mechanism accomplishes the following tasks:

Inhibits a repeated provision of the same service on a specific access or to a specific subscriber;

Inhibits provision of a service due to inconsistency between the access and/or subscriber and the service characteristics;

Inhibits provision and/or withdrawal of a service due to the definitive interaction criteria: Restricted or Dependent;

Inhibits provision and withdrawal of a service due to disallowed authority;

Enables automatic activation at provision when required;
Enables general provision and/or withdrawal of services when appropriate; and
Supports customizing of interaction handling.

At the time of a service activation or deactivation procedure request, the coordination mechanism accomplishes the following tasks:

Enables dual service activation and deactivation according to the service specifications;
Inhibits activation of a service due to inconsistency between the subscriber and the service characteristics;
Inhibits activation and/or deactivation of a service due to the definitive interactive criteria: Restricted or Dependent;
Enables activation or deactivation of a service according to the definitive interactive criteria: Override or Suppressed;
Detects and reports services which are subject to irresolute interaction handling;
Inhibits activation and deactivation of a service due to disallowed authority;
Enables automatic invocation at activation when required;
Enables general activation and deactivation of services when appropriate; and
Supports customizing of interaction handling.

At the time of a service invocation and operation procedure request, the coordination mechanism accomplishes the following tasks:

Enables dual service invocation according to the service specifications;
Inhibits invocation of a service due to the definitive interactive criteria: Restricted or Dependent;
Enables invocation of a service according to the definitive interactive criteria: Override or Suppressed;
Detects and reports services which are subject to irresolute interaction handling; and
Supports customizing of interaction handling.

The service coordination mechanism, when triggered by a service procedure request, compares and checks the validity of the input data reflecting the service and the subscriber characteristics, and replies with an appropriate result.

Coordination Mechanism Prerequisites

As prerequisites for the service coordination mechanism, input data must be: 1) quickly accessible due to real-time processing constraints; and 2) consistent and pertinent so that a conclusion can be reached based on that data.

These prerequisites are achieved through the implementation of the following:

a family concept for services and interactions;
subscriber characteristics profiles;
service characteristics profiles; and
subscriber, service, and interaction identifiers.

Family Concept

Each defined service forms a service family comprising a standard basic service and a set of customized versions of that service.

The following assumption makes the realization of a generic coordination mechanism possible:

The customizing of a service cannot result in a contradiction to the original service prose definition. Thus, a customized service is always recognized as a variant of the original service.

For example, the customizing of a service can be achieved by providing another definitive interaction or a different user informative interface, e.g., announcements, tones, or text messages.

Furthermore, each service family has an interaction handling family allowing four alternative capabilities:

1) basic service and basic interaction handling;
2) basic service and customized interaction handling;
3) customized service and basic interaction handling; or
4) customized service and customized interaction handling.

Subscriber and Service Characteristics Profile

FIG. 4 is an illustration of a record maintained by the present invention and providing a profile of the characteristics of a particular subscriber or service. As noted, a service functionality depends on the subscriber and the service characteristics within a telecommunication network. These characteristics associated with the coordinator mechanism characteristics are reflected in two profiles, namely, a subscriber characteristics profile and a service characteristics profile.

Each profile 16 consists of a record incorporating four identical information fields: a property field 17, a provision/withdrawal field 18, an activation/deactivation field 19 and an invocation and operation field 20.

The following information elements may be stored in their associated fields in a characteristics profile:

Property information elements:
　Access category:
　　Wired
　　Wireless
　Access type:
　　Analog
　　Digital
　　basic rate
　　primary rate
　Network category:
　　Public
　　Private
　Subscription type:
　　Individual
　　Operator facility (attendant)
　　group
　　network (e.g., coin box)
　Customizing indicator: Yes or no
Provision/withdrawal information elements:
　attendant controlled
　automatically activated (only for services)
　interactive service
　general provision/withdrawal
Activation/deactivation information elements:
　subscriber controlled
　automatically invoked (only for services)
　interactive service
　general activation/deactivation
Invocation and operation information elements:
　subscriber controlled
　traffic controlled
　interactive service The data within a subscriber characteristics profile designates a particular subscriber's subscription configuration and authority. The data within a service characteristics profile designates the applicability and conditional operation of a service.

Subscriber, Service, and Interaction Identifiers

The subscriber, service, and interaction identifiers are addressing tools for associating the subscriber, service, and interaction data being defined within an exchange. Each user-connection to the exchange is assigned a "subscriber identifier" to point-out the relevant subscriber characteristic profile. Each new service deployment in an exchange is associated with a "service identifier" to point-out the relevant service characteristic profile and its interaction handling.

In addition, the capability of customizing services and service interactions, and the introduction of the family concept, effectively modify the method used to control and process supplementary services. A subscriber having specific (customized) interaction requirements is assigned an "interaction identifier" which points-out his dedicated interaction data. The customized interaction requirements are triggered automatically by the coordination mechanism through a customizing indicator (pointer) within his subscriber characteristic profile.

FIG. 5 is an illustration of a service identifier utilized in the present invention to identify a service family and variation of a service within the family. FIG. 5 is also illustrative of the subscriber identifier and interaction identifier utilized in the present invention. The service family pointer 21 indicates the service family 22, and the customized service pointer 23 indicates the degree of customized services 24 within the indicated family. The range of the customized service pointer within a family is a telecommunication supplier option.

Coordination Mechanism State Machine

FIG. 6 is a block diagram of a coordination mechanism state machine 31 utilized in the service coordination mechanism of the present invention. Coordination requests are processed by the coordination mechanism according to its own state machine 31, which is operable within each service state, i.e., provided, activated, and invoked (FIG. 2).

Transitions by the coordination state machine 31 to the suspended coordination state 32 and the barred coordination state 33 are manipulated internally for administrative and interaction handling purposes. The processing of the coordination state machine 31 in relation to service states 12–15 is specified in the following axiom:

A request to transition between service states (FIG. 2), ordered in the forward direction (i.e., toward invoked 15), shall not be accepted unless the coordination state 32–35 (FIG. 6) associated with that service's state indicates 'Assigned' 34. For example, if a service is in the provided state 13 (FIG. 2) and a service activation procedure request is ordered, then the request is accepted only when the service coordination state within the service state 'provided' 13 has the value "assigned" 34.

Coordination Mechanism Data Structure

As previously stated, the generic service coordination mechanism manipulates all necessary data relevant to handling definitive interaction problems. These data are grouped into profile files, allocation files, and interaction files to facilitate the accessibility and the management of the data.

Profile Files

FIG. 7 is an illustration of a series of subscriber characteristics profiles 41 and a series of service characteristics profiles 42 which are stored as dedicated "profile files" in the present invention. These files are accessed by the subscriber identifier SUBI 43 and the service identifier SERI 44 as described in conjunction with FIG. 5.

Allocation Files

FIG. 8 is an illustration of a service allocation indication file 51 utilized in the present invention to store the service states 12–15 and associated coordination mechanism states 32–35 which are valid for a particular subscriber. Service allocation indication files 51 are used within the generic coordination mechanism to manipulate and access dynamic service status information during traffic and network operation. Allocation files 51 store the service states 12–15 and associated coordination mechanism states 32–35 that are valid for particular users.

There are two types of allocation files 51, general allocation files 52 and individual allocation files 53, used in the present invention. Each type has a different service processing procedure within an exchange.

FIG. 9 is an illustration of a general allocation file 52 utilized in the present invention to store service states 12–15 and associated coordination mechanism states 32–35 for services which are provided on a general basis to a specific group of subscribers. The general allocation file 52 is addressed by the service family pointer 21 (FIG. 5) within a service identifier, SERI 44. This restrictive addressing is required because only a few services within a family can be validly provided on a general basis for a specific group of subscribers. However, the capability to bar any customized service for administrative reasons requires accessibility for all services within a general allocation file 52.

FIG. 10 is an illustration of a dynamic file structure of an individual allocation file 61 in the service coordination mechanism of the present invention. The individual allocation file 61 is addressed by the subscriber identity, SUBI 43 and handles the user's service subscription indications and the reference to his customized interaction. Since a subscriber in practice will subscribe to a limited number of services, the individual allocation file 61 can be realized with a dynamic file structure as illustrated in FIG. 10.

A constraint condition applied to the cooperation between the general allocation file 52 and the individual allocation file 61 is that an individual service allocation indication will always override the general service allocation indication unless the service has a barring coordination state 33 (See FIG. 6).

Interaction Files

Interaction data are stored in an interaction file record where the relevant interactions associated with a particular service procedure are indicated.

FIG. 11A is an illustration of an interaction file record 66 which identifies relevant interactions 67 associated with service procedures in the service coordination mechanism of the present invention. Furthermore, the definitive interaction criteria (see FIG. 3) applicable between two interactive services are expressed by a limited set of values since some criteria override other criteria.

FIG. 11B is a table illustrating allowed combinations of service criteria in the service coordination mechanism of the present invention. FIG. 11B shows the allowed combinations of service criteria values from FIG. 3: Restricted (R), Dependent (D), Override (O), Suppressed (S), and Yes (Y).

The customizing of interactions puts some constraints on the structure of the interaction files 66. Thus, the interaction files 66 are internally divided into two files, basic interaction files and customized interaction files.

As part of basic interaction handling, specific interaction requirements associated with customized services 24 (FIG. 5) within a service family 22 may be stored. Therefore, the basic interaction file comprises two associated files, a service family interaction file 71 and a service interaction file 81.

FIG. 12A is an illustration of a service family interaction file 71 in the service coordination mechanism of the present invention. The service family interaction file 71 is addressed by the service family pointer 21 (FIG. 5).

FIG. 12B is an illustration of a service interaction file 81 in the service coordination mechanism of the present invention. The service interaction file 81 is addressed by the service identifier, SERI 44 (FIG. 7). The service interaction file 81 is triggered automatically within the coordination mechanism by reading the "customizing indicator value" 23 (FIG. 5) in the property information field 17 of the service characteristic profile 16 (see FIG. 4). An interaction criteria value (FIG. 3) encountered within the service interaction file 81 overrides the interaction criteria value valid for that service family.

FIG. 13 is an illustration of a customized service interaction file 91 in the service coordination mechanism of the present invention. In practice, a telecommunication customer may have individual service interaction requirements which differ from the ordinary interactions specified by the network operator or service providers. These individual requirements are stored within the customized service interaction file 91 which is triggered automatically within the coordination mechanism by reading the interaction identifier (FIG. 5) found within the individual allocation file 52 (FIG. 9).

Coordination Mechanism Architecture

FIG. 14 is a high level functional block diagram illustrating the interaction between various functional blocks in the generic service coordination mechanism of the present invention. The generic service coordination mechanism 101 is realized by means of functional blocks (objects) 102–108 which store coordination and interaction data, and coordinate or manipulate the coordination mechanism by means of internal communication interfaces 109 and external communication interfaces 110 and 111.

Each block within the coordination mechanism 101 cooperates with the other blocks and performs a specific task. A coordinator administrative block (CORA) 104, for example, handles all procedures generated from an administrative operator site (not shown) connected to the coordination mechanism 101 through external communications interface 110. A coordinator traffic handling block (CORT) 102 handles subscriber or traffic initiated procedures which are communicated to the coordination mechanism 101 through external communications interface 111. The task of CORA 104 and CORT 102 is to validate incoming requests and distribute them to the relevant coordinator block(s). A coordinator data storage block (CORD) 103 stores and manipulates the profile files 41 and 42 (FIG. 7), as well as the general and individual allocation files 52 and 61 (FIGS. 9 and 10). An interaction data block (INTD) 108 stores and manipulates the interaction files 71, 81, and 91 (FIGS. 12A–13). Blocks 105–107, discussed below, handle the validation and coordination of service interactions according to the service characteristics profile 16 (FIG. 4) which specifies the coordination mechanism characteristics valid for those service procedures.

The coordination mechanism's external interfaces 110 and 111 comprise three information flows which respectively manipulate the profile files 41 and 42, the allocation files 52 and 61, and the interaction files 71, 81, and 91. Upon reception of a coordination request, the generic coordination mechanism 101 may perform the following processes:

1) Initiate (I): define and store new coordinator data;
2) Read (R): extract the requested coordinator data;
3) Change (C): modify existing coordinator data; or
4) Erase (E): delete existing coordinator data.

The administrative block (CORA) 104 accepts and handles the four processes (I, R, C & E) for manipulation of coordinator and interaction data while the traffic block (CORT) 102 accepts and handles a selection of the four processes depending on the data to be manipulated (e.g., R for profile data, R & C for allocation data, and R for interaction data).

FIG. 15 is a table illustrating profile data information flow utilized in the manipulation of profile files 41 and 42 in the service coordination mechanism of the present invention. The property, P&W, A&D and I&O parameters are normally optional (OPT), but are mandatory (MAN) within the request of the coordinator process Initiate (I) and within the response of the coordinator process Read (R).

FIG. 16 is a table illustrating allocation data information flow utilized in the manipulation of allocation files 52 and 61 in the service coordination mechanism of the present invention. The mandatory indication (MAN) within the response is applicable only when the parameter is supplied in the request.

FIG. 17 is a table illustrating interaction data information flow utilized in the manipulation of interaction files 71, 81, and 91 in the service coordination mechanism of the present invention. The "swap indicator" parameter indicates that an initiated (inserted) interaction criteria value between two services is valid in both directions (X→Y and Y→X).

Coordination Mechanism Processing

The main processes of the generic service coordination mechanism's procedures are controlled within CORA 104 and CORT 102 which in turn distribute the requested functionality to subprocesses performed in the other coordinator blocks. Hereafter, some examples are described to illustrate the administrative interface through CORA 104, such as a service deployment procedure, new subscription procedure, and service allocation procedures. Thereafter, a service activation procedure is presented to illustrate the traffic interface through CORT 102.

Service Deployment Procedure

FIG. 18 depicts a flowchart of a service deployment routine performed by the coordination mechanism of the present invention. At deployment of a new service, an administrative operator enters the service characteristic's profile 16 (FIG. 4) and the service interaction data at step 121. Then, at step 122, CORA 104 analyzes the profile contents, and at step 123, specifies a service identifier (FIG. 5). At step 124, it is determined whether or not the new service is in a new service family. If yes, the routine moves to step 125 where CORA 104 updates the general allocation file 52 in CORD 103 with the new service identifier (SERI) 44. Simultaneously, CORA 104 orders blocks 105–107 to update their respective interaction files at 126. If it was determined at step 124 that the service is not in a new service family, the routine moves directly to step 126 where CORA 104 orders blocks 105–107 to update their respective interaction files.

Figure 19:
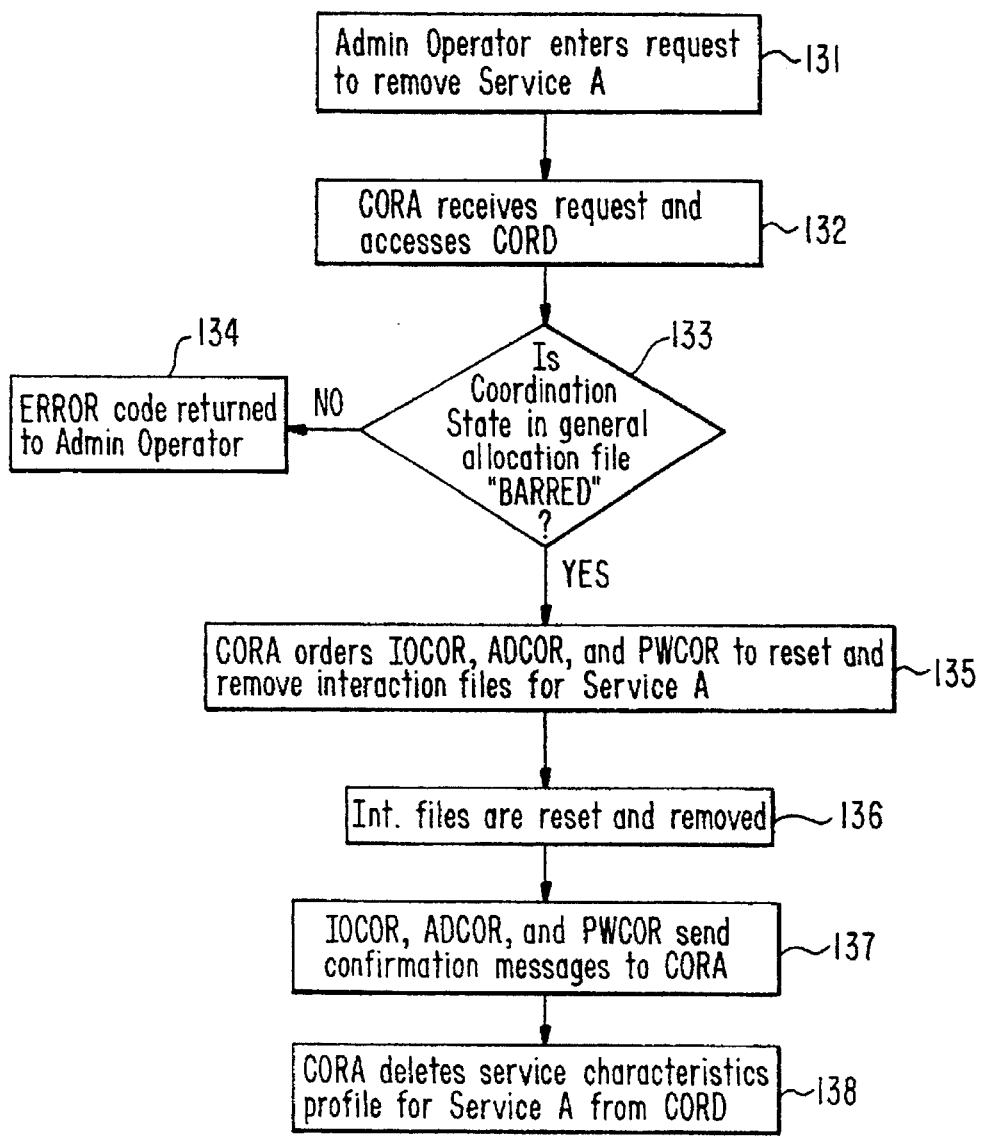
FIG. 19 depicts a flowchart of a service removal routine performed by the coordination mechanism of the present invention.

FIG. 19 depicts a flowchart of a service removal routine performed by the coordination mechanism of the present invention. At step 131, an administrative operator enters a request to remove service "A". At 132, CORA 104 receives the request and accesses CORD 103 where it is determined at step 133 whether or not the coordinator state within the general allocation file 52 for that service is "BARRED" 33 (FIG. 6). If not, an error code is returned to the administration operator at 134. If barred at 133, the routine moves to step 135 where CORA 104 orders blocks 105–107 to reset and remove their respective interaction files for service "A" which is accomplished at step 136. Then, at 137, blocks 105–107 each send a confirmation message to CORA 104. Upon reception of those confirmations at step 138, CORA 104 deletes the service characteristic profile 16 from CORD 103.

New Subscriptions

Figure 20:
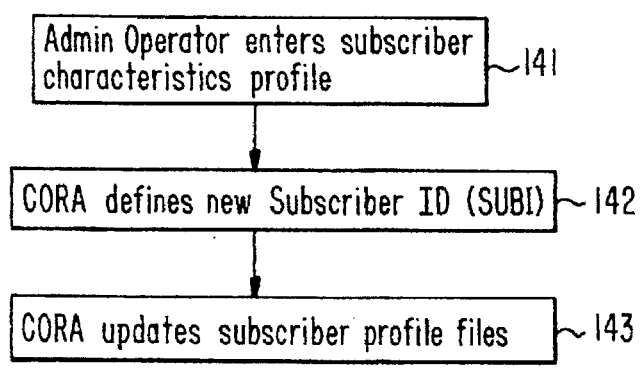
FIG. 20 depicts a flowchart of a routine for adding a new subscription which is performed by the coordination mechanism of the present invention.

FIG. 20 depicts a flowchart of a routine for adding a new subscription which is performed by the coordination mechanism of the present invention. At step 141, the administrative operator enters the subscriber characteristic's profile 16. Then, at step 142, CORA 104 defines a new subscriber identifier (SUBI) (FIG. 5). At step 143, CORA 104 updates the subscriber profile files 43 (FIG. 7).

Figure 21:
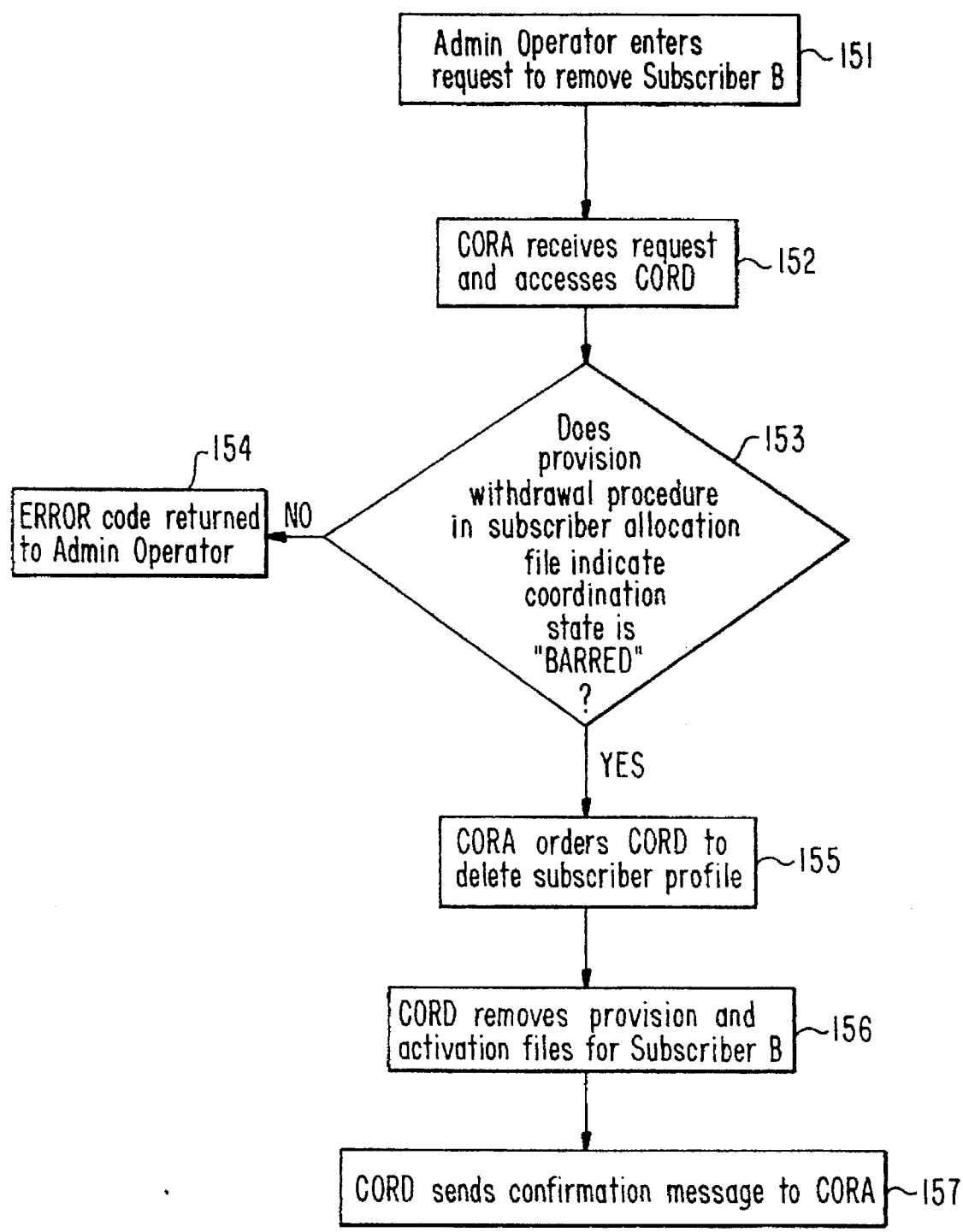
FIG. 21 depicts a flowchart of a routine for removing a subscription which is performed by the coordination mechanism of the present invention.

FIG. 21 depicts a flowchart of a routine for removing a subscription which is performed by the coordination mechanism of the present invention. At step 151, the administrative operator enters a request to remove subscriber "B". At 152, CORA 104 receives the request and accesses CORD 103 where it is determined at step 153 whether or not the provision withdrawal procedure within the subscriber allocation file indicates that the coordinator state is "BARRED" 33 (FIG. 6) for all services. If the coordinator state is not barred, an error code is returned to the operator at 154. Otherwise, the routine moves to step 155 where CORA 104 orders CORD 103 to delete the subscriber profile for subscriber "B". At 156, CORD 103 removes the provision and the activation allocation files for subscriber "B" and at step 157, returns a confirmation message to CORA 104.

Service Allocation on a General Basis

Figure 22:
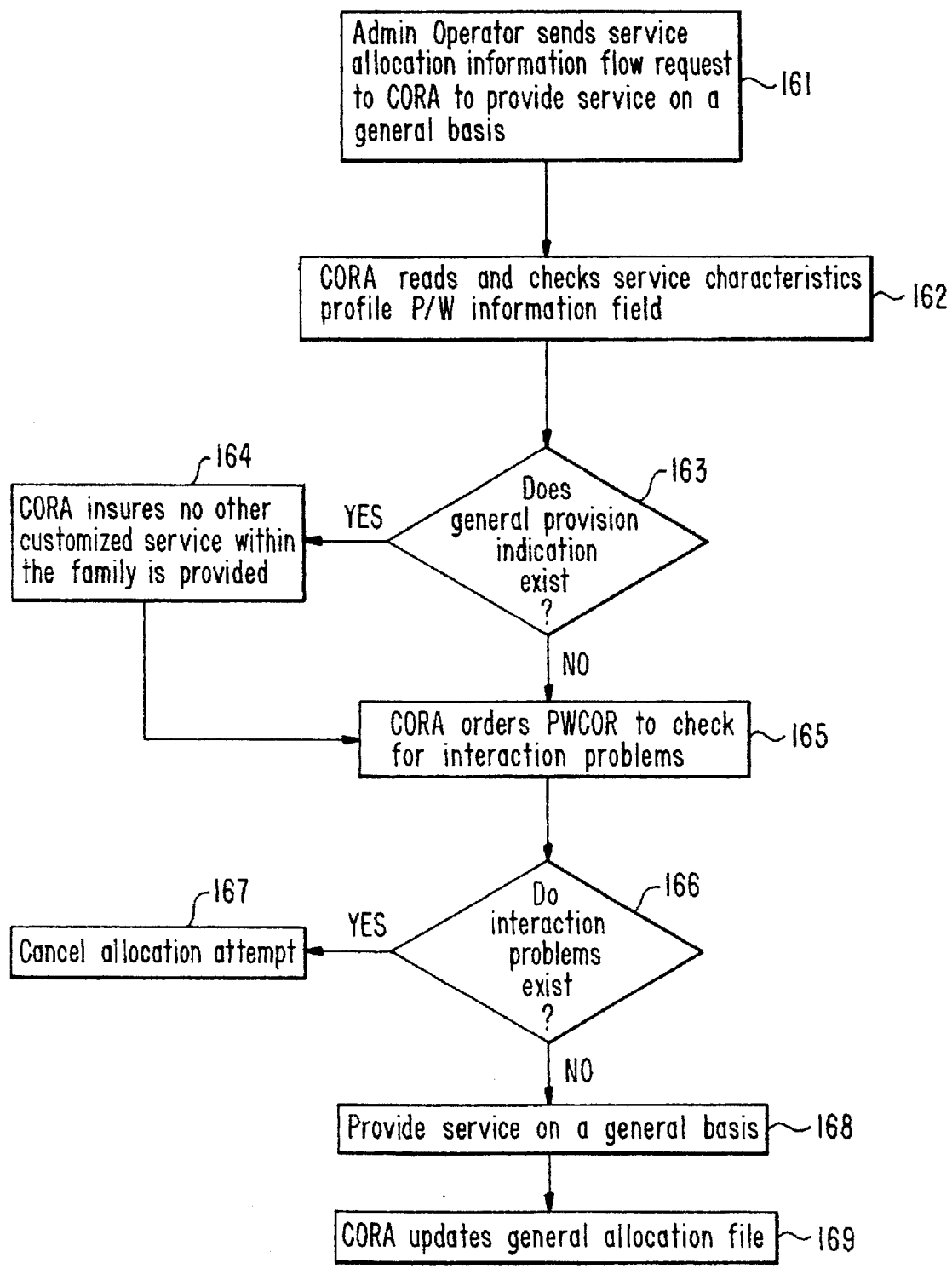
FIG. 22 depicts a flowchart of a routine performed by the coordination mechanism of the present invention for general provisioning of a service.

FIG. 22 depicts a flowchart of a routine performed by the coordination mechanism of the present invention for general provisioning of a service. At step 161, the administrative operator sends a service allocation information flow request with appropriate values to CORA 104 to provide a service on a general basis. At step 162, CORA 104 reads and checks the service characteristics profile provision and withdrawal information field 17 (FIG. 4). At 163, it is determined whether or not a general provision indication exists. If the indication exists, the routine moves to 164 where CORA 104 insures that no other customized service 24 within the service family 22 is already provided. The routine then moves to step 165 where CORA 104 orders the Provision and Withdrawal Coordinator Block (PWCOR) 107 to determine whether any interaction problems exist. If it is determined at step 166 that interaction problems exist, the routine moves to 167 where the attempt is cancelled. Otherwise, the routine moves to step 168 where the provision is accomplished on a general basis. At step 169, if the service data indicates implicit activation, then CORA 104 initiates the activation procedure to update the general allocation file 52.

Figure 23:
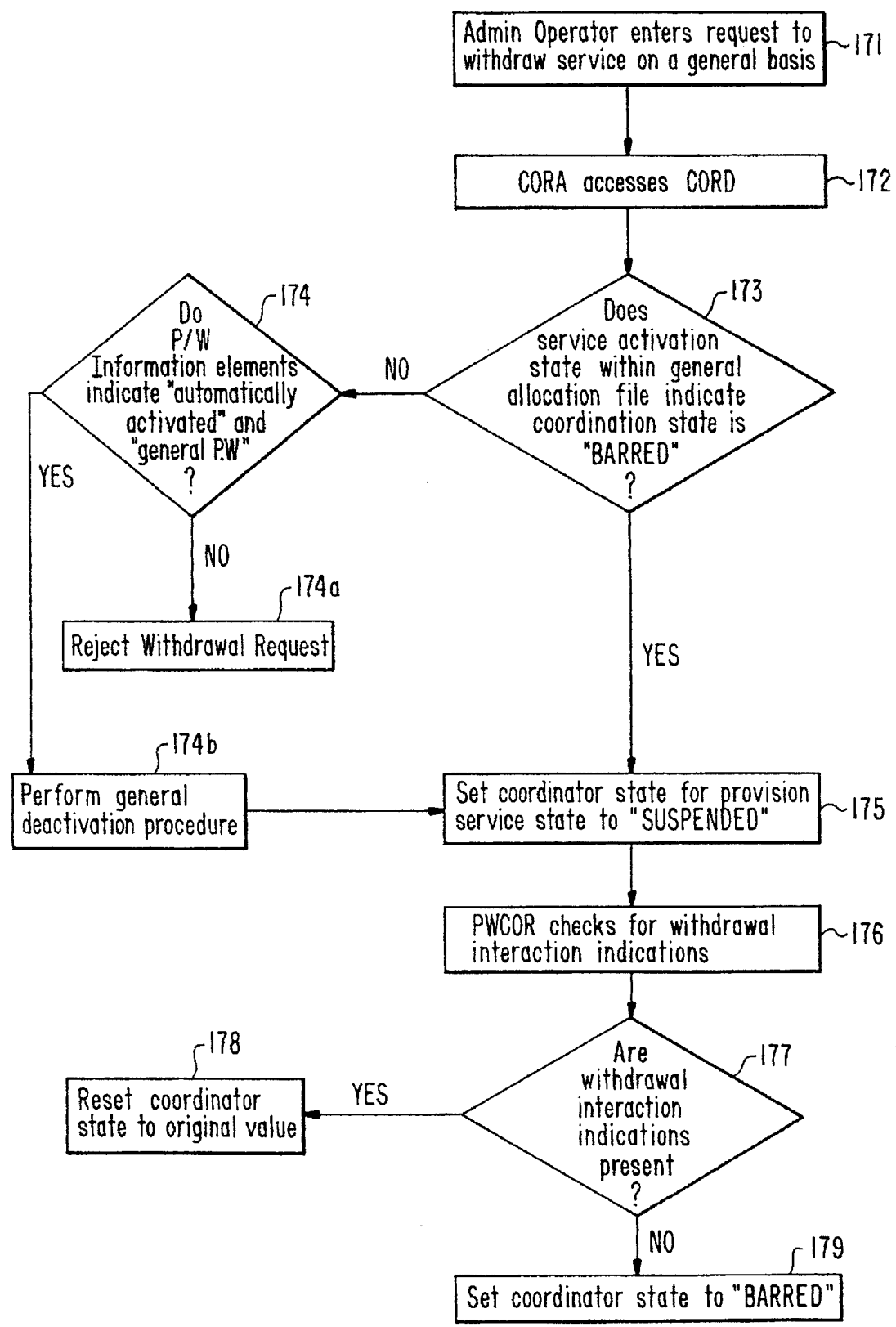
FIG. 23 depicts a flowchart of a routine performed by the coordination mechanism of the present invention for general withdrawal of a service.

FIG. 23 depicts a flowchart of a routine performed by the coordination mechanism of the present invention for general withdrawal of a service. At step 171, the administrative operator sends a request with appropriate values to CORA 104 to withdraw a service on a general basis. At 172, CORA 104 accesses CORD 103, and at 173, determines whether or not the service activation state within the general allocation file 52 indicates that the coordinator state is "BARRED" 33 (FIG. 6). If not, then the routine moves to step 174 where it is determined whether or not the provision/withdrawal information elements in the service characteristics profile indicate "automatically activated" and "general provision/withdrawal". If not, the routine moves to step 174a where the withdrawal request is rejected. This may occur when, for example, a general deactivation procedure must be performed first. For example, HOLD cannot be withdrawn if 3PTY is not withdrawn first. If at step 174 it is determined that the noted indications are found in the provision/withdrawal information elements, the routine moves to step 174b where a general deactivation procedure is performed internally within the coordinator which changes the coordination state to "BARRED".

If, at step 173, it was determined that the coordinator state is barred, then the routine moves to step 175 where the coordinator state for the provision service state is set to "SUSPENDED" 32. At 176, PWCOR 107 checks for withdrawal interaction indications. At step 177, it is determined whether or not withdrawal interaction indications are present. If they are present, then the routine moves to step 178 where the coordinator state is reset to its original value. The original value can be either "ASSIGNED" 34 or "NULL" 35 in the general allocation files. If it is determined at step 177 that interaction indications are not present, then the routine moves to step 179 where the coordinator state is set to "BARRED" 33.

The withdrawal of a service on a general basis permits the service provider or network operator to block the accessibility to that service during real-time operation of an exchange. This process can be used for updating the service functionality without affecting the individual allocation files.

Service Allocation on an Individual Basis

Figure 24:
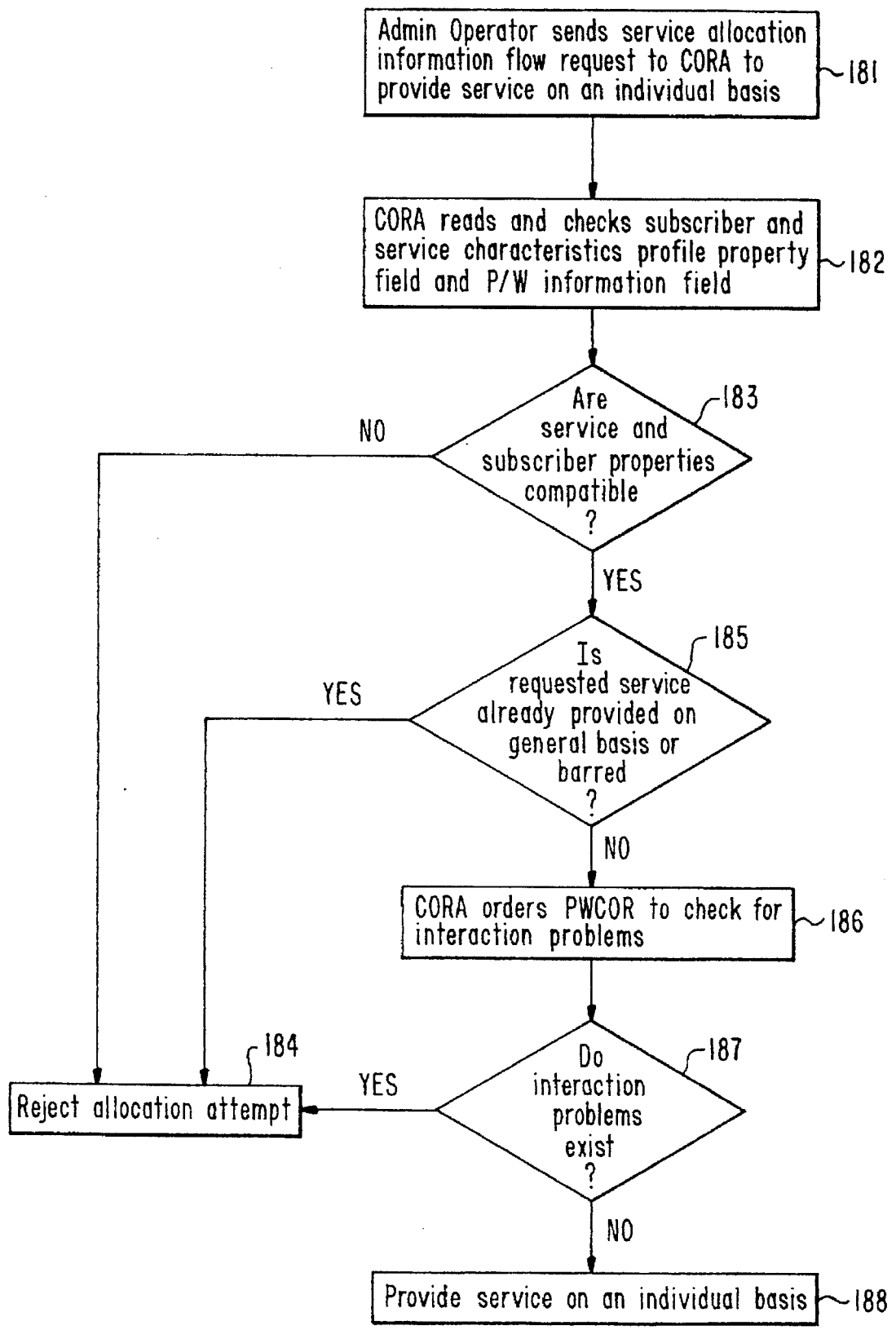
FIG. 24 depicts a flowchart of a routine performed by the coordination mechanism of the present invention for servitude allocation on an individual basis.

FIG. 24 depicts a flowchart of a routine performed by the coordination mechanism of the present invention for service allocation on an individual basis. At step 181, the administrative operator sends a service allocation information flow request with appropriate values to CORA 104. At 182, CORA 104 reads and checks the subscriber and the service characteristics profile property field 17 (FIG. 4) and the provision and withdrawal information field 18. At 183, it is determined whether or not the service and the subscriber properties are compatible. If not, then the routine moves to step 184 where the service allocation procedure is rejected. If the service and the subscriber properties are compatible at 183, then the routine moves to 185 where CORA 104 determines whether or not the requested service is already provided on a general basis, or is barred. If yes, the routine moves to 184 where the service allocation procedure is rejected. If the service is not provided or barred, the routine moves to step 186 where CORA 104 orders PWCOR 107 to check for interaction problems. At step 187, it is determined whether or not interaction problems exists. If interaction problems exist, the routine moves to 184 where the service allocation procedure is rejected. If, however, at step 187 interaction problems do not exist, the service allocation is accomplished at 188. If the service data indicates implicit activation, then CORA 104 initiates the activation procedure.

Figure 25:
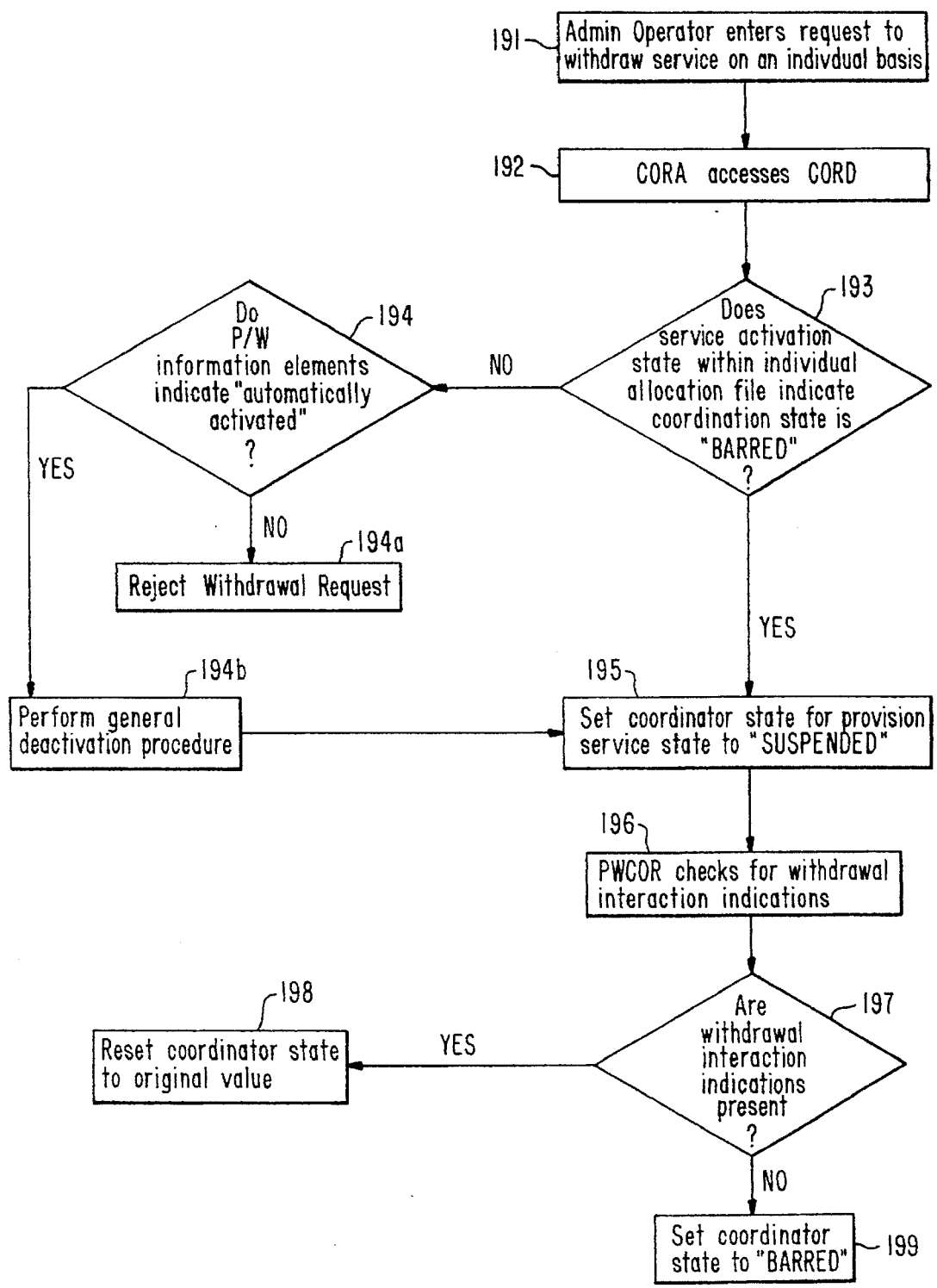
FIG. 25 depicts a flowchart of a routine for withdrawal of a service on an individual basis which is performed by the coordination mechanism of the present invention.

FIG. 25 depicts a flowchart of a routine for withdrawal of a service on an individual basis which is performed by the coordination mechanism of the present invention. At step 191, the administrative operator sends a request with appropriate values to CORA 104 requesting the withdrawal of an individual service. CORA 104 accesses CORD 103 at step 192 which, at 193, determines whether or not the service activation state within the individual allocation file 61 indicates that the coordinator state is "BARRED" 33. If not, the routine moves to step 194 where it is determined whether or not the provision/withdrawal information elements in the service characteristics profile indicate "automatically activated". If not, the routine moves to step 194a where the withdrawal request is rejected. This may occur when, for example, a general deactivation procedure must be performed first. If at step 194 it is determined that "automatically activated" is found in the provision/withdrawal information elements, the routine moves to step 194b where a general deactivation procedure is performed internally within the coordinator which changes the coordination state to "BARRED".

If, at step 193, it was determined that the coordinator state is barred, then the routine moves to step 195 where the coordinator state for the provision service state is set to "SUSPENDED" 32. At 196, PWCOR 107 checks for withdrawal interaction indications. At 197 it is determined whether or not withdrawal interaction indications are present. If such indications are present, the routine moves to step 198 where the coordinator state is reset to its original value. The original value may be either "ASSIGNED" 34 or "NULL" 35. Thus, the service can be generally available, but withdrawn individually for a specific user. If, however, at step 197 no withdrawal interaction indications are present, then the routine moves to step 199 where the coordinator state is set to "BARRED" 33.

Service Activation Procedure Through Traffic Interface

Figure 26B:
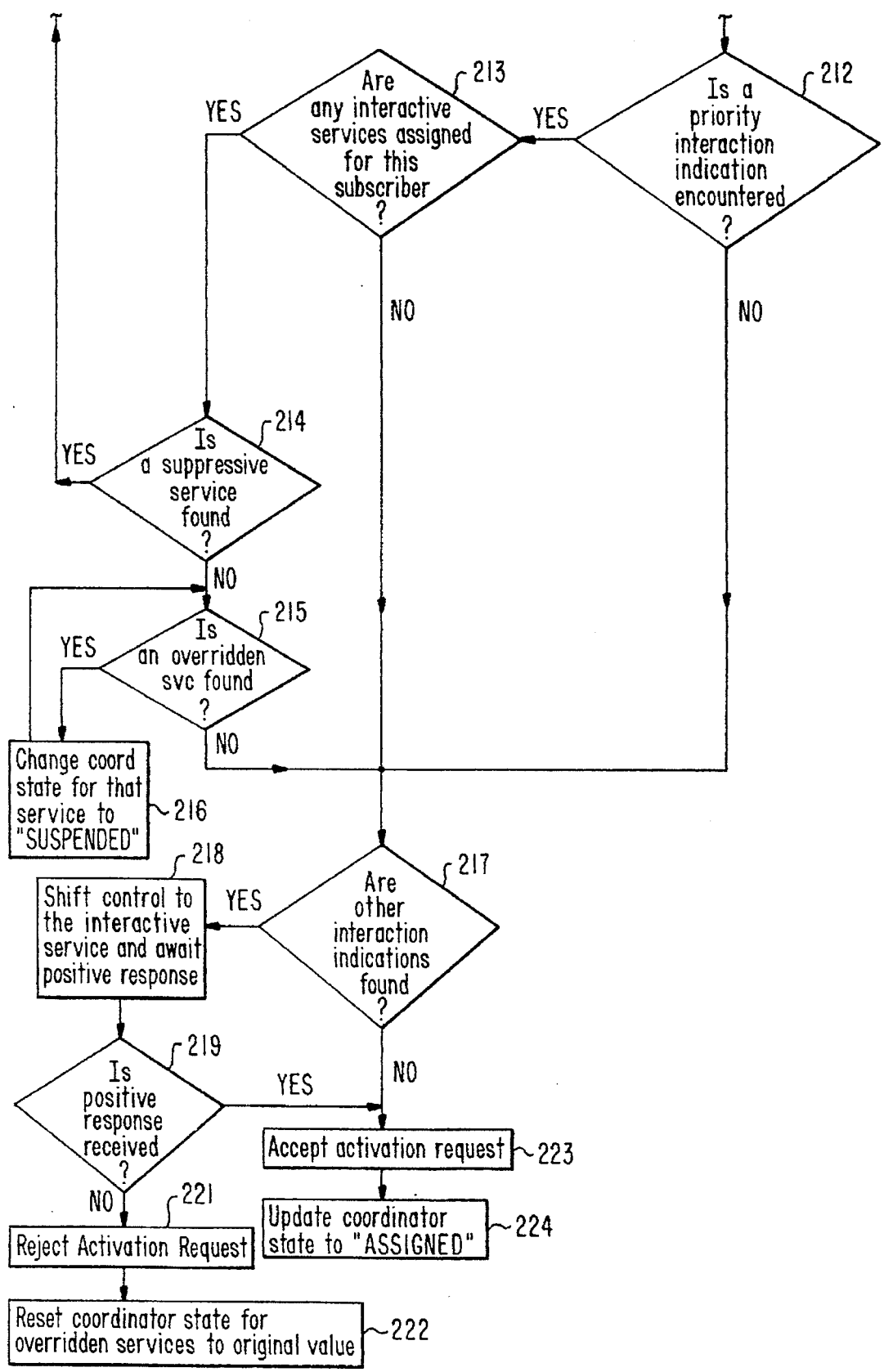
FIG. 26 shows the proper alignment of the drawing sheets for FIGS. 26A–26B.

FIGS. 26A–26B collectively depict a flowchart of a routine performed by the coordination mechanism of the present invention when a request for service activation is received through the traffic interface 111. At step 201, the coordination mechanism is invoked by receiving a service allocation information flow request with appropriate values in CORT 102. Then, at 202, CORT 102 reads and checks the service and the subscriber characteristics activation and deactivation information field 18 (FIG. 4). At 203, CORT 102 orders the Activation and Deactivation Coordinator block (ADCOR) 106 to perform the service allocation. ADCOR 106, upon receiving the request, determines at 204 whether or not the individual provision allocation is equal to "ASSIGNED" 34 (FIG. 6). If not, the routine moves to step 205 where the activation request is rejected. If the individual provision allocation is equal to "ASSIGNED" 34, the routine moves to step 206 where ADCOR 106 determines whether or not the activation state in the general allocation file is "BARRED" 33. If the activation state in the general allocation file is "BARRED", the routine moves to step 205 where the activation request is rejected. If, at 206 it was determined that the activation state is not "BARRED", the routine moves to step 207 where ADCOR 106 performs a service interaction checking procedure.

The service interaction checking procedure is performed by checking for a customized interaction file (FIG. 10), and determining whether the service has only interaction, or customized service interaction, or both. After these determinations are made, the relevant interaction files within the Interaction Data block (INTD) 108 are scanned at step 208.

The interaction indication files are scanned in the order of permissive, conditional, and then other. At step 209, it is determined whether or not a permissive interaction indication is encountered (restricted or dependent). If a permissive interaction indication is encountered, the routine moves to step 211 where ADCOR 106 reads the allocation file and determines whether or not any of the interactive services assigned for this subscriber are conflicting with the interaction criteria. This may occur, for example, when a restrictive service activation state is equal to "ASSIGNED" 34 or a dependent service activation state is not equal to "ASSIGNED" 34. If the permissive interaction criteria are not met, the routine moves to step 205 where the service procedure is rejected. If, at step 211, the assigned interactive services are not conflicting with the interaction criteria, the routine moves instead to step 212 where ADCOR 106 proceeds with the remaining interaction checking. At step 212, it is determined whether or not a priority interaction indication is encountered (override or suppress). If a priority interaction indication is encountered, the routine moves to step 213 where ADCOR 106 determines whether or not any of the interactive services are assigned for the applicable subscriber. If assigned, the routine moves to step 214 where it is determined whether or not any of the assigned interactive services are suppressive services. If a suppressive service is found, the routine moves to step 205 where the activation request is rejected. If a suppressive service is not found, then the routine moves to step 215 where it is determined whether or not any of the assigned interactive services are overridden. If an overridden service is found, the routine moves to step 216 where the coordinator state for that service is changed to "SUSPENDED" 32 (FIG. 6), whereupon the routine returns to step 215. If no overridden is found, or all overridden interactive services become "SUSPENDED" 32, the routine moves to step 217.

If, however, at step 212, a priority interaction indication was not found, the routine moves to step 217. Likewise, at step 213, if there are no interactive services assigned to the applicable subscriber, then the routine moves to step 217. At step 217, ADCOR 106 proceeds with the remaining interaction criterium "other" by determining whether or not other interactions are found for any service. If other interactions are found, the routine moves to step 218 where ADCOR 106 shifts control to the interactive service and awaits a positive response. At step 219, it is determined whether or not a positive response is received. If a negative response is received, the routine moves to step 221 where the activation request is rejected. At step 222, the routine resets the coordinator state for any overridden services to their original values. If a positive response is received at step 219, the routine moves to step 223 where the service activation request is accepted. If, at step 217, no other interaction indications are found, the routine moves directly to step 223 where the service activation request is accepted. Finally, at step 224, the coordinator state is updated to "ASSIGNED" 34 (FIG. 6).

Alternative Embodiment

Alternatively, the generic service coordination mechanism of the present invention can be implemented by classifying each service in a network within a group of services identified by a service classification indicator. The benefit achieved by this embodiment is the distribution of the coordination mechanism's data among several files. This data distribution restricts the number of linked records and decreases the coordinator processing time.

As an example, when the classifications specified by CCITT Recommendation I. 210 are used, and the services are grouped into originating, terminating, mid-call, and network services, then each group has its own allocation files and interaction files. The coordination mechanism, when invoked, receives a basic call event, whereupon the proper classified allocation files and interaction files are addressed. The format of an extreme service classification indicator parameter may have a parameter field of eight bits (A-H), thereby allowing 127 groups of services.

FIG. 27 is table illustrating service classification parameter field codes utilized in a service classification indicator of eight bits in the service coordination mechanism of the present invention.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of controlling supplementary service interactions in a real-time telecommunications network, said method comprising the steps of:

analyzing supplementary services in said real-time telecommunications network to identify service and network elements which affect service processing;

collecting data associated with said supplementary service interactions;

analyzing said data associated with said supplementary service interactions, said data analyzing step further comprising:

identifying different types of supplementary service interactions; and identifying supplementary service interaction criteria which are valid for each of said identified types of supplementary service interactions; and determining whether or not to accept new supplementary services and withdraw existing supplementary services based upon said analysis of identified service and network elements, identified types of supplementary service interactions, and identified supplementary service interaction criteria.

2. The method of claim 1 wherein the step of analyzing supplementary services in said real-time telecommunications network to identify service and network elements which affect service processing includes defining various states for said supplementary services.

3. The method of claim 2 wherein the step of defining various states for said supplementary services includes defining the supplementary services states "null", "provided", "activated", and "invoked".

4. The method of claim 3 wherein the step of determining whether or not to accept new supplementary services and withdraw existing supplementary services includes defining a service state machine which transitions supplementary services from one of said states to another.

5. The method of claim 4 wherein the step of analyzing supplementary services in said real-time telecommunications network to identify service and network elements which affect service processing includes defining various states for coordination requests.

6. The method of claim 5 wherein the step of defining various states for coordination requests includes defining the coordination states "null", "assigned", "suspended", and "barred".

7. The method of claim 6 wherein the step of determining whether or not to accept new supplementary services and withdraw existing supplementary services includes defining a coordination mechanism state machine which is operable within each of said service states for transitioning coordination requests from one of said states to another.

8. The method of claim 7 wherein said supplementary services comprise originating services, terminating services, mid-call services, and network services.

9. The method of claim 8 wherein the step of identifying different types of supplementary service interactions includes identifying definitive interactions and irresolute interactions.

10. The method of claim 9 wherein the step of identifying definitive interactions includes identifying definitive interactions based on permissive processes and definitive interactions based on priority-decisive processes.

11. The method of claim 10 wherein the step of identifying supplementary service interaction criteria which are valid for each type of supplementary service interaction includes the steps of:

identifying the supplementary service interaction criteria "allowed", "restricted", and "dependent" as valid for supplementary interactions based on permissive processes; and identifying the supplementary service interaction criteria "override" and "suppressed" as valid for interactions based on priority-decisive processes.

12. The method of claim 1 further comprising the steps of:

analyzing a subscriber's connection and supplementary service allocation characteristics; and analyzing a supplementary service's operational environment characteristics.

13. The method of claim 12 wherein the step of analyzing a subscriber's connection and supplementary service allocation characteristics includes the step of determining the subscriber's access type and user class.

14. The method of claim 13 wherein the step of analyzing a supplementary service's operational environment characteristics includes determining a network type, a service type, and a state criteria for said supplementary service.

15. A generic coordination system for coordinating service interactions during provision and withdrawal of subscriber supplementary services in a telecommunications network, each of said supplementary services having specifications and characteristics, said coordination system comprising:

means for inhibiting a repeated provision of a supplementary service to a specific subscriber;

means, cooperating with said means for inhibiting a repeated provision of a supplementary service to a specific subscriber, for inhibiting a repeated provision of a supplementary service on a specific access by said specific subscriber;

means for inhibiting provision of a supplementary service when subscriber's access type, and said supplementary service's characteristics are inconsistent;

means for storing definitive interaction criteria for each subscriber supplementary service in said network;

means for inhibiting provision and withdrawal of a particular supplementary service when particular said supplementary service's definitive interaction criteria identify said particular supplementary service as "restricted";

means, cooperating with said means for inhibiting provision and withdrawal of a particular supplementary service when said particular supplementary service's definitive interaction criteria identify said supplementary service as "restricted", for inhibiting provision and withdrawal of a particular supplementary service when said supplementary service's definitive interaction criteria identify said supplementary service as "dependent";

means for inhibiting provision and withdrawal of a particular supplementary service due to disallowed authority;

means for enabling provision and withdrawal of supplementary services to individual subscribers;

means, cooperating with said means for enabling provision and withdrawal of supplementary services to individual subscribers, for enabling general provision and withdrawal of supplementary services;

means for enabling automatic activation of a supplementary service at provision; and means for customizing interaction handling.

16. A generic coordination system for coordinating service interactions during activation and deactivation of subscriber supplementary services in a telecommunications network, each of said supplementary services having specifications and characteristics, said coordination system comprising:

means for enabling dual supplementary service activation and deactivation according to a particular supplementary service's specifications;

means for inhibiting activation of a particular supplementary service when said subscriber's access type and said supplementary service's characteristics are inconsistent;

means for storing definitive interaction criteria for each subscriber supplementary service in said network;

means for inhibiting activation and deactivation of a particular supplementary service when said supplementary service's definitive interaction criteria identify said supplementary service as "restricted";

means, cooperating with said means for inhibiting activation and deactivation of a particular supplementary service when said supplementary service's definitive interaction criteria identify said supplementary service as "restricted", for inhibiting activation and deactivation of a particular supplementary service when said supplementary service's definitive interaction criteria identify said supplementary service as "dependent";

means for enabling activation and deactivation of a supplementary service when said supplementary service's definitive interaction criteria identify said supplementary service as an "override" service;

means, cooperating with said means for enabling activation and deactivation of a supplementary service when said supplementary service's definitive interaction criteria identify said supplementary service as an "override" service, for enabling activation and deactivation of a supplementary service when said supplementary service's definitive interaction criteria identify said supplementary service as "suppressed";

means for detecting and reporting supplementary services which are subject to irresolute interaction handling;

means for inhibiting activation and deactivation of a supplementary service due to disallowed authority;

means for enabling general activation and deactivation of supplementary services;

means for automatically invoking a particular supplementary service at activation; and means for customizing interaction handling.

17. A generic coordination system for coordinating service interactions during invocation and operation of subscriber supplementary services in a telecommunications network, each of said supplementary services having specifications and characteristics, said coordination system comprising:

means for enabling dual service invocation according to a particular supplementary service's specifications;

means for storing definitive interaction criteria for each subscriber supplementary service in said network;

means for inhibiting invocation of a particular supplementary service when said supplementary service's definitive interaction criteria identify said supplementary service as "restricted";

means, cooperating with said means for inhibiting invocation of a particular supplementary service when said supplementary service's definitive interaction criteria identify said supplementary service as "restricted", for inhibiting invocation of a particular supplementary service when said supplementary service's definitive interaction criteria identify said supplementary service as "dependent";

means for enabling invocation of a particular supplementary service when said supplementary service's definitive interaction criteria identify said supplementary service as an "override" service;

means, cooperating with said means for enabling invocation of a particular supplementary service when said supplementary service's definitive interaction criteria identify said supplementary service as an "override" service, for enabling invocation of a particular supplementary service when said supplementary service's definitive interaction criteria identify said supplementary service as "suppressed";

means for detecting and reporting supplementary services which are subject to irresolute interaction handling; and means for customizing interaction handling.

18. A method of providing one supplementary service of a service family on a general basis to a telecommunications network having a coordination mechanism which includes a supplementary service provision and withdrawal coordinator, a general allocation file, a supplementary service characteristic's profile for each supplementary service, and supplementary service interaction files for supplementary service provision and withdrawal, supplementary service activation and deactivation, and supplementary service invocation and operation, said method comprising the steps of:

reading a provision and withdrawal information field in said supplementary service characteristics profile;

determining if a general provision indication exists in said provision and withdrawal information field;

insuring, if a general provision indication exists, that no customized supplementary service in the service family of said supplementary service is already provided;

determining, with said provision and withdrawal coordinator, whether any interaction problems exist by accessing said supplementary service interaction files;

providing, if no interaction problems exist, said supplementary service on a general basis; and updating said general allocation file.

* * * * *

UNITED STATES PATENT AND TRADEMARK OFFICE
CERTIFICATE OF CORRECTION

PATENT NO. : 5,657,451
DATED : Aug. 12, 1997
INVENTOR(S) : Khello

It is certified that error appears in the above-identified patent and that said Letters Patent is hereby corrected as shown below:

Column 4, line 35    Replace "Of"
                     With --of--

Column 4, line 56    Replace "servitude"
                     With --service--

Column 5, line 62    Delete "p1-"
                     And begin a new paragraph with
                     "Service interface blocking."

Column 7, line 7     Replace "Analysis."
                     With --Analysis--

Column 7, line 24    Replace "damage"
                     With --damages--

Column 20, line 36   Replace "particular said"
                     With --said particular--

Signed and Sealed this

Tenth Day of February, 1998

Attest:

BRUCE LEHMAN

Attesting Officer    Commissioner of Patents and Trademarks